(12) United States Patent
Yoon

(10) Patent No.: US 7,414,712 B2
(45) Date of Patent: Aug. 19, 2008

(54) LARGE DYNAMIC RANGE SHACK-HARTMANN WAVEFRONT SENSOR

(75) Inventor: Geunyoung Yoon, Pittsford, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 11/803,121

(22) Filed: May 11, 2007

(65) Prior Publication Data
US 2007/0247698 A1   Oct. 25, 2007

Related U.S. Application Data

(63) Continuation-in-part of application No. 10/778,888, filed on Feb. 13, 2004, now abandoned.

(60) Provisional application No. 60/447,344, filed on Feb. 13, 2003.

(51) Int. Cl.
*G01J 1/00* (2006.01)
(52) U.S. Cl. .................................. 356/121
(58) Field of Classification Search ............ 356/121
See application file for complete search history.

(56) References Cited

U.S. PATENT DOCUMENTS

| | | | |
|---|---|---|---|
| 4,413,890 A | 11/1983 | Belkin et al. |
| 4,744,649 A | 5/1988 | Niino et al. |
| 5,090,795 A | 2/1992 | O'Meara et al. |
| 5,125,730 A | 6/1992 | Taylor et al. |
| 5,329,322 A | 7/1994 | Yancey |
| 5,479,221 A | 12/1995 | Heine et al. |
| 5,777,719 A | 7/1998 | Williams et al. |
| 5,861,938 A | 1/1999 | Heacock |
| 5,943,117 A | 8/1999 | Van de Velde |
| 5,949,521 A | 9/1999 | Williams et al. |
| 6,027,216 A | 2/2000 | Guyton et al. |
| 6,079,830 A | 6/2000 | Kohayakawa |

(Continued)

FOREIGN PATENT DOCUMENTS

EP    0 221 649    5/1987

(Continued)

OTHER PUBLICATIONS

Yoon; The Shack-Hartmann Wavefront Sensor, University of Rochester Web Site, http://www.cvs/Rochester.edu/yoonlab/wavefront.htm, 2003.

(Continued)

*Primary Examiner*—Roy M Punnoose
(74) *Attorney, Agent, or Firm*—James W. Hill; McDermott Will & Emery LLP

(57) ABSTRACT

A wavefront sensor for measuring a wavefront contains an array of lenslets, a detector array, and a mask having a temporally fixed pattern containing one or more opaque regions that are substantially opaque to light from the wavefront. The mask comprises one or more transmissive regions that are transmissive of light from the wavefront. The mask and the array of lenslets are disposed such that light from the wavefront that is transmitted by the transmissive regions is focused by onto the detector array by the array of lenslets. The mask is adapted to be selectably disposed to any one of a plurality of predetermined positions, wherein a different group of lenslets from the array focuses light from the wavefront onto the detector array depending on which of the plurality of predetermined positions is selected.

20 Claims, 14 Drawing Sheets

U.S. PATENT DOCUMENTS

| | | | | |
|---|---|---|---|---|
| 6,086,204 | A | * | 7/2000 | Magnante .................. 351/212 |
| 6,095,651 | A | | 8/2000 | Williams et al. |
| 6,264,328 | B1 | | 7/2001 | Williams et al. |
| 6,276,800 | B1 | | 8/2001 | Baker |
| 6,299,311 | B1 | | 10/2001 | Williams et al. |
| 6,379,005 | B1 | | 4/2002 | Williams et al. |
| 6,548,797 | B1 | * | 4/2003 | Ai .......................... 250/201.9 |
| 6,819,414 | B1 | * | 11/2004 | Takeuchi ................... 356/124 |
| RE38,839 | E | * | 10/2005 | Magnante .................. 351/212 |
| 2003/0025874 | A1 | | 2/2003 | Williams et al. |

OTHER PUBLICATIONS

Yoon et al.; Large-dynamic-range Shack-Hartmann wavefront sensor for highly aberrated eyes; Journal of Biomedical Optics; May/Jun. 2006; pp. 030502-1-030502-3; vol. 11(3).

Lindlein et al.; Algorithm for expanding the dynamic range of a Shack-Hartmann sensor by using a spatial light modulator array; Optical Engineering; May 2001; pp. 837-840; vol. 40 No. 5.

* cited by examiner

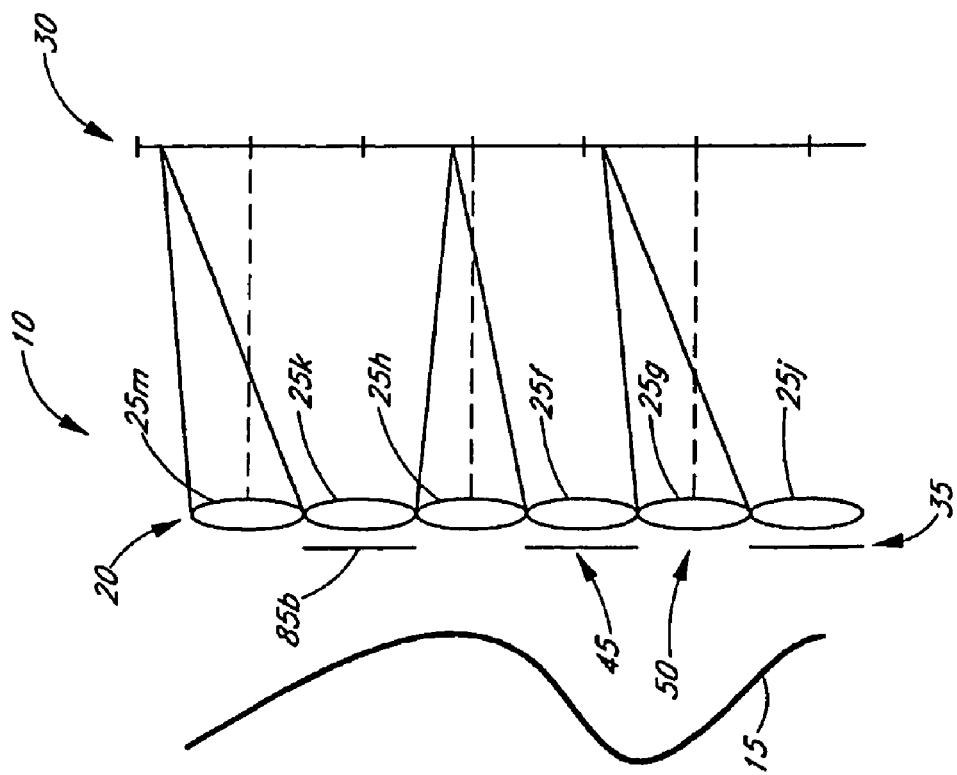
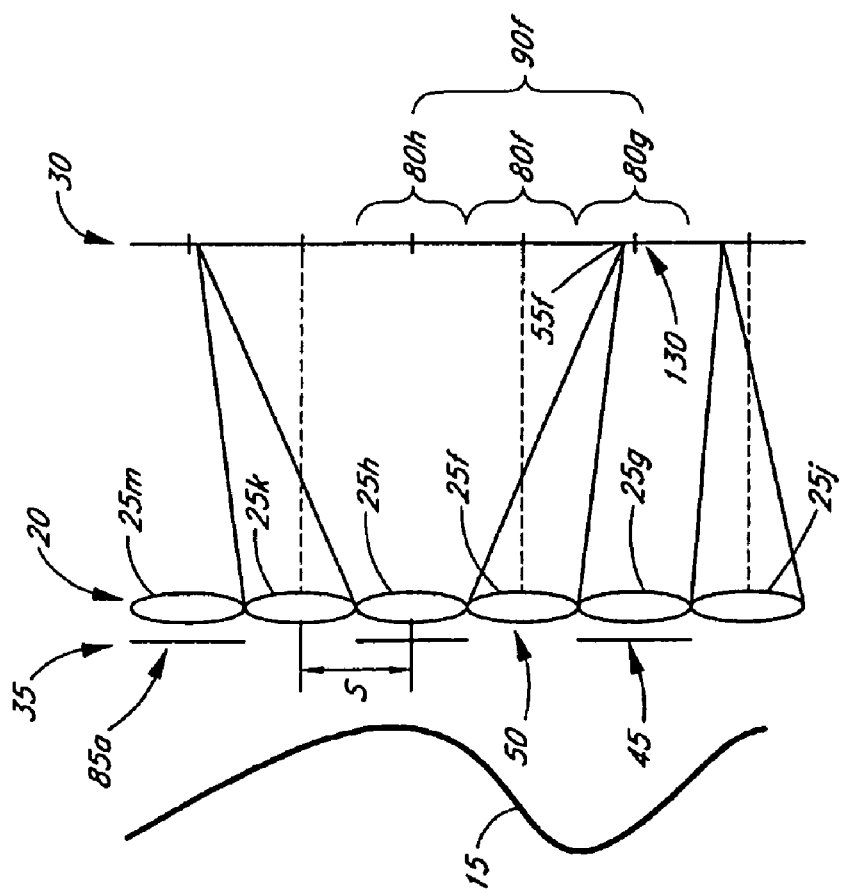

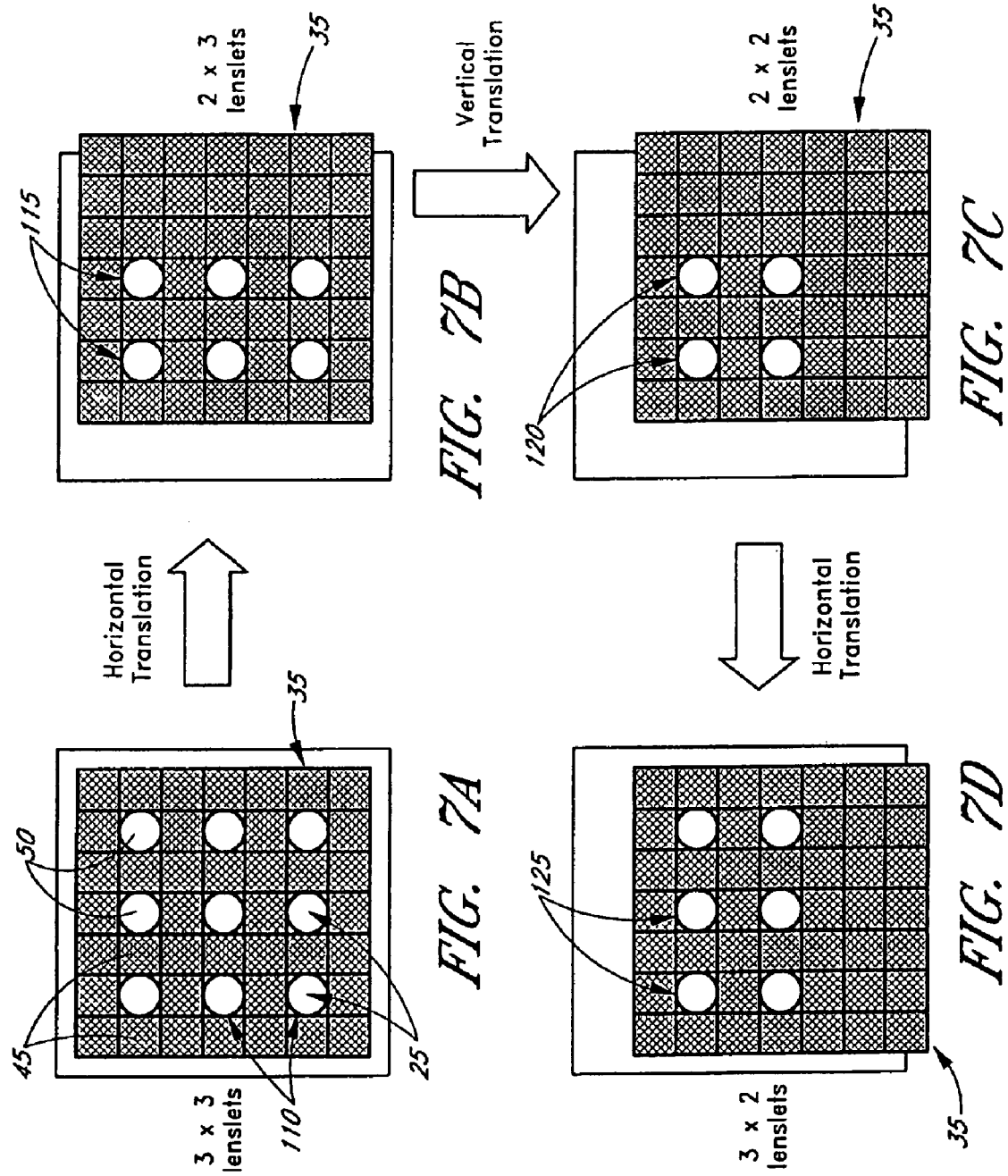

LARGE DYNAMIC RANGE SHACK-HARTMANN WAVEFRONT SENSOR

RELATED APPLICATIONS

This application is a continuation-in-part of U.S. application Ser. No. 10/778,888, filed Feb. 13, 2004, which claims the priority benefit of U.S. Provisional Application No. 60/447,344, filed Feb. 13, 2003, both of which are hereby incorporated in their entirety by reference.

GOVERNMENT LICENSE RIGHTS

The U.S. Government has a paid-up license in this invention and the right in limited circumstances to require the patent owner to license others on reasonable terms as provided for by the terms of Contract/Grant Nos. 5R01EY14999, awarded by the National Institutes of Health.

BACKGROUND OF THE INVENTIONS

1. Field of the Inventions

The present disclosure is directed to a wavefront measuring device, and more specifically, to a Shack-Hartmann type wavefront sensor with a large dynamic range.

2. Description of the Related Art

The Shack-Hartmann technique is commonly used for determining wavefront shape or error from an ideal planar wavefront. The Shack-Hartmann wavefront sensor is a slope measurement device typically comprising a lenslet array, a two-dimensional detector array, acquisition hardware, and analysis software. Each lenslet in the array receives light from a portion of an incident wavefront. Light from the lenslet is focused within a "virtual" subaperture of the detector array, the detector subaperture generally being defined by those pixels disposed within a projection of the lenslet onto the detector array. The location of the focused light from a particular lenslet within each of these detector subapertures is used to determine the nominal slope of that portion of the incident wavefront. By calculating the slope of the incident wavefront from each spot displacement at each of the lenslets, the shape of the wavefront can be determined.

The dynamic range of a Shack-Hartmann wavefront sensor is typically based on the focal length of the lenslets and the dimensions of the detector subaperture, in units of pixel number, for each lenslet. In prior-art systems, the combination of lenslet focal length and detector subaperture dimensions usually limits the maximum wavefront slope that can be measured. If the slope of a wavefront at one or more of the lenslets exceeds such a predetermined limit, the focus spots from such lenslets move into the subaperture of another lenslet, resulting in one of the following problems: (1) multiple spots are created within a single subaperture, (2) multiple spots overlap within a single subaperture, and (3) spots switching between subapertures. For instance, if the wavefront slope in the area of a first lenslet in the array exceeds this maximum, the light received by the first lenslet produces a focus that is outside the bounds of a corresponding first detector subaperture and is instead received by in a second detector subaperture corresponding to a second lenslet in the array. The presence of the focus from the first lenslet in the second detector subaperture results in an ambiguity, since it cannot be determined, a priori, from which lenslet the focused light came.

Which of the three listed problems is produced depends on what happens with the focus spot from the second lenslet. If the wavefront slope at the second lenslet does not exceed the maximum limit, problems (1) or (2) can result. In the case of problem (1), it is indeterminate which spot belongs to which lenslet. In the case of problem (2), the focus of the second lenslet is indeterminate, since there is insufficient information to determine whether the second focus spot is located at that of another lenslet or the second focus spot is absent. If the wavefront slope at the second lenslet does exceed the maximum limit, problem (3) results. In this case an error can results since the focus spots will usually not be associated with the correct lenslet. These problems can exist between two lenslets or several lenslets.

One solution to increase the dynamic range is to decrease the focal length of lenslets in the lenslet array. The result of such a design choice is to increase the amount of wavefront slope needed to exceed the bounds of the corresponding detector subaperture. The drawback to this choice is that the sensitivity of the wavefront sensor is decreased proportionately if all other system parameters remain the same as they were in the longer focal length lenslet design.

Another method of increasing the dynamic range is suggested in an article by Lindlein, et. al. (see "Algorithm for expanding the dynamic range of a Shack-Hartmann sensor by using a spatial light modulator array," Optical Engineering, 40(5) 837-840 (May 2001), the entirety of which is hereby incorporated by reference). Lindlein et. al. disclose the use of a spatial light modulator (SLM) to create a sequence of switching patterns that mask differing sets of lenslets in the lenslet array of a Shack-Hartmann sensor. Use of the switching patterns removes the requirement that each lenslet focus light within a detector subaperture. Using the method disclosed by Lindlein et. al., the focus spots formed by light from each lenslet may be located anywhere on the detector, with the exception that "spots are not allowed to overlap." The authors calculate the minimum number of switching patterns necessary to provide an unambiguous correlation between wavefront slopes and the focus spot locations on a sensor array.

The authors also provide an algorithm for determining which lenslet array subapertures are "switched off" in each switching pattern. For instance, an array of 40 lenslets by 40 lenslets would require nine different switching patterns. Each switching pattern has a form that is different from the other. The Lindlein et. al. method preclude taking a fixed switching pattern and simply moving the pattern to a different coordinate at each step in the sequence.

A need exist, therefore, for providing a simple device and method for resolving ambiguities produced in Shack-Hartmann type wavefront sensor that are created by large wavefront slopes, thus increasing the dynamic range of such wavefront sensors.

SUMMARY OF THE INVENTION

One way of increasing the dynamic range of a Shack-Hartmann wavefront sensor is by blocking and unblocking individual lenslets within the array thereof in a temporally predetermined manner. While a particular lenslet is blocked, the detector subaperture associated with that lenslet is precluded from receiving light incident on that lenslet. Thus, the detector subaperture for the blocked lenslet is available to receive a signal from another, unblocked lenslet in a potentially unambiguous manner. The blocked lenslet may then be unblocked while simultaneously blocking other lenslets in a prescribed manner. Thus, a predetermined sequence of blocking lenslets within the lenslet array may be used to increase the dynamic range of a Shack-Hartmann wavefront sensor One aspect of the present disclosure involves a device for measuring a wavefront. The device comprises an array of lenslets, a detector array, and a mask having a temporally fixed pattern containing one or more opaque regions that are substantially opaque to light from the wavefront and one or more transmissive regions that are transmissive of light from the wavefront. The mask and the array of lenslets are disposed such that light from the wavefront that is transmitted by the transmissive regions is focused onto the detector array by the array of lenslets. The mask is adapted to be selectably disposed to any one of a plurality of predetermined positions, wherein a different group of lenslets from the array of lenslets focuses light from the wavefront onto the detector array depending on which of the plurality of predetermined positions is selected.

In yet another aspect of the present disclosure a method for measuring a wavefront comprises providing a wavefront sensor containing a detector array, an array of lenslets, and a mask having a temporally fixed pattern containing one or more opaque regions that are substantially opaque to light from the wavefront and one or more transmissive regions that are transmissive of light from the wavefront. The method further comprises disposing the array of lenslets such that two lenslets from the array of lenslets are capable of focusing light from the wavefront onto a point on the detector array. The method additionally comprises disposing the mask such that only one of the two lenslets focuses light from the wavefront onto the point.

Another aspect of the present disclosure involves a method for measuring a wavefront comprises providing a wavefront sensor containing a detector array, an array of lenslets, and a mask having a temporally fixed pattern containing one or more opaque regions that are substantially opaque to light from the wavefront and one or more transmissive regions that are transmissive of light from the wavefront. The method also comprises disposing the mask to a first location wherein a first plurality of lenslets from the array of lenslets focuses light from the wavefront onto the detector array. The method further comprises moving the mask to a second location wherein a second plurality of lenslets from the array of lenslets focus light from the wavefront onto the detector array.

Yet another aspect of the present disclosure involves a device for measuring a wavefront containing a detector array and a spatial light modulator (SLM) having a first plurality of zones and a second plurality of zones. The first plurality of zones is adapted to substantially block light from a first portion of the wavefront such that light from the first portion of the wavefront is not received by the detector array. The second plurality of zones is adapted to form a plurality of focusing elements that focus light form the wavefront to produce a corresponding plurality of foci on the detector array. The plurality of foci produces a plurality of signals for estimating the slope of the wavefront at the plurality of focusing elements.

Still another aspect of the present disclosure involves a method for measuring a wavefront comprises providing a wavefront sensor containing a detector array, a lens, and a mask having an aperture adapted to transmit from light from the wavefront. The method additionally comprises disposing the mask to a first location, wherein light from a first portion of the wavefront is transmitted by the aperture and is focused by the lens onto the detector array to produce a first signal. The method further comprises moving the mask to a second location, wherein light from a second portion of the wavefront is transmitted by the aperture and is focused by the lens onto the detector array to produce a second signal. The method also comprises using the first signal to determine the slope of the first portion of the wavefront and using the second signal to determine the slope of the second portion of the wavefront.

BRIEF DESCRIPTION OF THE DRAWINGS

The foregoing features, aspects, and advantages of the present disclosure will now be described with reference to the drawings of preferred embodiments that are intended to illustrate and not to limit the disclosure. The drawings comprise ten figures.

FIG. 6 is a side view of wavefront sensor according to an embodiment of the present disclosure.

FIG. 7 is a front view of mask overlaying a lenslet array as the mask is moved to different locations in accordance with an embodiment of the present disclosure.

DETAILED DESCRIPTION OF THE INVENTION

These and other embodiments of the present disclosure will also become readily apparent to those skilled in the art from the following detailed description of preferred embodiments having reference to the attached figures; however, the disclosure is not limited to any particular embodiment(s) disclosed herein. Accordingly, the scope of the present disclosure is intended to be defined only by reference to the appended claims.

Wavefront Sensor

Figure 1:
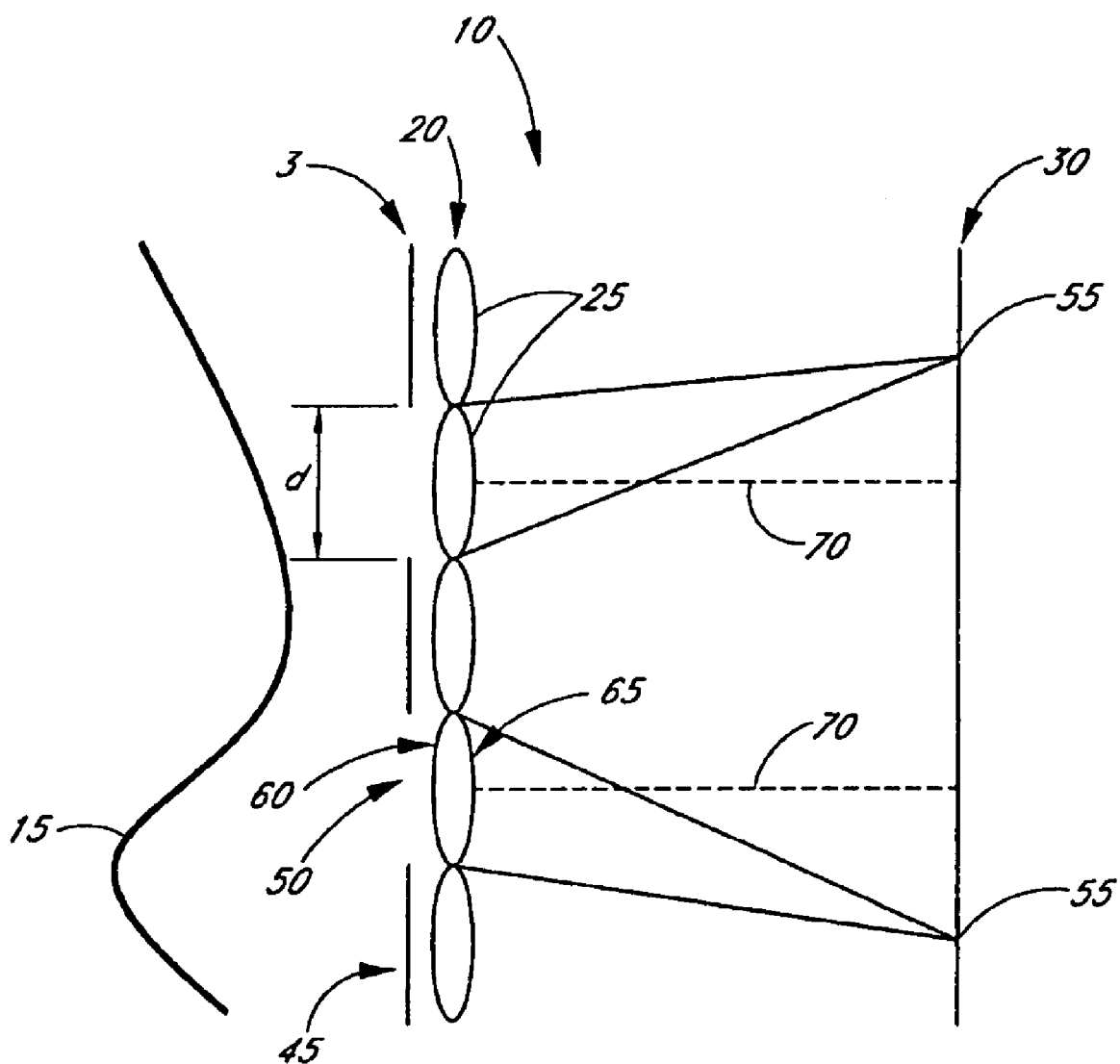
FIG. 1 is a side view of a wavefront sensor for measuring a wavefront according to embodiments of the present disclosure.
Figure 3:
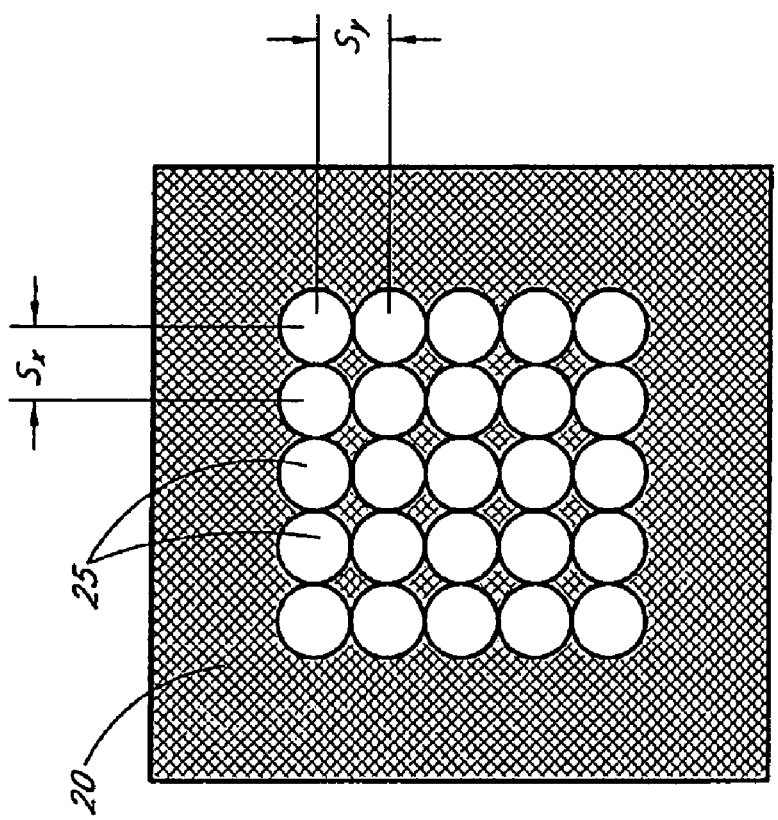
FIG. 3 is a front view of a array used in certain embodiments of a wavefront sensor for measuring a wavefront.
Figure 2:
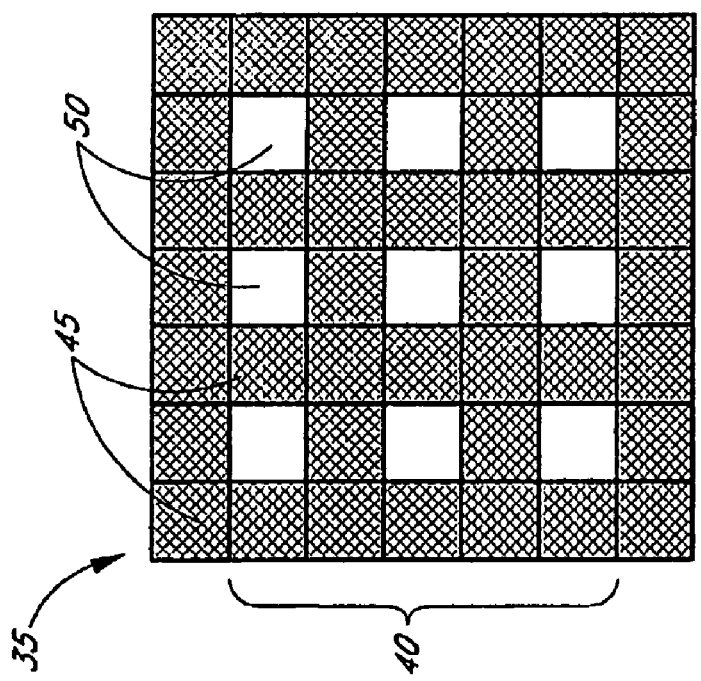
FIG. 2 is a front view of an mask of lenslets used in certain embodiments of a wavefront sensor for measuring a wavefront.

FIGS. 1, 2, and 3 schematically illustrate a wavefront sensor 10 for measuring a wavefront 15. The wavefront sensor 10 comprises an array 20 of lenslets 25, a detector array 30, and a mask 35 having a temporally fixed pattern 40 containing one or more opaque regions 45 that are substantially opaque to light from the wavefront 15 and one or more transmissive regions 50 that are transmissive of light from the wavefront 15. The mask 35 and the array 20 of lenslets 25 are disposed such that light from the wavefront 15 that is transmitted by the transmissive regions 50 is focused by onto the detector array 30 by the array 20 of lenslets 25. The mask 35 is adapted to be selectably disposed to any one of a plurality of predetermined positions, wherein a different group of lenslets 25 from the array 20 focuses light from the wavefront 15 onto the detector array 30 depending on which of the plurality of predetermined positions is selected. The light from the wavefront 15 that is focused on the detector array 30 forms a plurality of focus points 55. The locations of the plurality of focus points 55 may be correlated to the nominal slope of the wavefront 15 over the aperture of each lenslet 25 focusing light from the wavefront 15.

The array 20 of lenslets 25 is preferably disposed in a two-dimensional grid that samples at least a portion of the wavefront 15. For example, FIG. 3 schematically illustrates an embodiment wherein the array 20 of lenslets 25 comprises a grid pattern having 5 rows by 5 columns of lenslets 25. Alternatively, other patterns may be advantageously used, such as a hexagonal pattern. The array 20 may optionally be disposed to form a single row or a single column of lenslets 25. Preferably, the array 20 of lenslets 25 has a fill factor that approaches to one; however, this is not critical to the operation of the wavefront sensor 10, which may, in principal, be used when the array 20 of lenslets 25 has a fill factor that is much less than one. For example, for the array 20 of lenslets 25 illustrated in FIG. 3, each lenslet 25 has a circular cross-section when viewed from the front. In such cases, the fill factor is approximately 0.785 (.pi./4). Alternatively, each lenslet 25 may have a cross-section that is substantially square or rectangular when viewed from in front of the array 20 of lenslets 25. In such cases, the fill factor is approximately one. Other cross-section may also be used consistent with embodiments of the wavefront sensor 10.

When disposed in the form of a two-dimensional grid, the lenslets have a nominal spacing along the horizontal and vertical axes of the figure of $s_x$ and $s_y$, respectively. Preferably, the magnitudes of the spacings $s_x$, $s_y$ are substantially equal, wherein the nominal spacing is designated as s ($=s_x=s_y$); however, unequal values of the magnitudes of the spacings $s_x$ and $s_y$ are also consistent with embodiments of the present disclosure. The diameter of the lenslets 25 along the horizontal and vertical axes is preferably substantially equal to the magnitudes of the spacings $s_x$, $s_y$. The diameters of the lenslets 25 along the horizontal and vertical axes is preferably small enough so that only a small portion of wavefront 15 to be sampled by each lenslet 25. Each lenslet 25 has a diameter that is preferably between about 100 micrometers and 2 millimeters; however, lenslet diameters above or below this range are compatible with embodiments of the disclosure.

Ordinarily, the array 20 is substantially square and has an equal number of lenslets 25 along the horizontal and vertical axes; however, there is no requirement that either of these conditions be true. For example, if there are more horizontal pixels than vertical pixels for a particular sensor array 30, it may be it desirable to use a array 20 of lenslets 25 that has more horizontal lenslets than vertical lenslets.

In certain embodiments, the wavefront sensor is used to measure a wavefront 15 originating from a human eye. In such embodiments, the array 20 of lenslets 25 is square or rectangular and has horizontal and vertical diameters that are preferably at least about 8 millimeters. In other applications of the wavefront sensor 10, the size and shape of the array 20 may be otherwise configured to conform to predetermined design parameters of the system or wavefront being measured. The number of lenslets along each of the horizontal and vertical axes of the array 20 will depend on the size of the wavefront 15 being measured, the size and focal length of the lenslets 25, and the desired wavefront slope resolution. Generally, the number of lenslets along each of the horizontal and vertical axes of the array 20 preferably in a range of approximately 4 to 80 lenslets. For a given size detector array 30, those skilled in the art can determine the optimum number of lenslets appropriate for a set of design constraints. For instance, as the number of lenslets increases the wavefront slope is measured at more locations over the wavefront 15; however, for a given detector array 30, the number pixels within a subaperture is reduced. This may result in a decrease in the resolution or dynamic range of the wavefront slope measurement. It is envisioned that as the state of the art for the fabrication of lenslet and sensor arrays advances, even larger numbers of lenslets will become both possible and desirable.

In certain embodiments, each of the lenslets 25 focuses light from the wavefront 15 by using refraction. In such embodiments, each lenslet 25 has a front surface 60 and back surface 65 that may be spherical in shape and made of a commonly used optical material such as fused silica or silicon. Alternatively, either or both of the surfaces 60, 65 may be substantially flat or aspheric so as to provide favorable optical and/or fabrication characteristics. In other embodiments, the array 20 of lenslets 25 comprises a diffractive optical element that focuses light from the wavefront 15 based on diffractive interaction with each lenslet.

In certain embodiments, the lenslets 25 each have a nominal focal length of f and a nominal diameter d that is substantially equal to the spacing s of the lenslets 25. Each of the lenslets 25 also has an optical axis 70 defined by a line passing through the center of the lenslet 25 and extending in a direction that is approximately normal to the center portion of the back surface 65 of each lenslet 25.

Various fabrication techniques are common in the art for producing the micro-lenses from which the array 20 of lenslets 25 is comprised. Such techniques include molding technology, ink-jet printing technology, and photolithography. Such techniques may be used produces lenslets 25 are either refractive or diffractive in nature. For instance, one manufacturer uses a photolithographic process that includes designing a gray-scale mask that is used to pattern a photoresist-coated substrate. The gray-scale mask has a high-resolution pattern with a range of optical densities that are used in the photolithographic process to pattern the photoresist. This pattern is then etched into the substrate using a plasma-etch process. Using such processing, the manufacturer can fabricate a lenslet with virtually any desired shape.

The detector array 30 is preferably a one or two dimensional sensor array such as a charge coupled device (CCD) or a complementary metal oxide semiconductor (CMOS) detector array. In certain embodiments, the detector array 30 produces a signal comprising the locations of the plurality of focus points 55 and a computer or similar such device receives the signal for processing information contained in the signal. As used herein, the term "focus point" is a broad term and is used in its ordinary sense and refers, without limitation, to the small area defined by the intersection of light from a focused wavefront with a plane disposed normal to the optic axis of the focusing element and near the circle of least confusion characteristic of such focused wavefronts.

The detector array 30 may additionally comprise a plurality of detector subapertures 80, each detector subaperture 80 corresponding to a lenslet 25 in the array 20. In certain embodiments, the detector subapertures 80 represent a grouping of pixels from detector array 30 rather than a physical boundary. Each detector subaperture 80 generally comprises those pixel of the detector array 30 located within the projection of the corresponding lenslet 25 from the array 20. Preferably, the direction of such a projection from the corresponding lenslet 25 is along the optical axis 70 of the corresponding lenslet 25.

In certain embodiments, the mask 35 comprises a substantially flat substrate such as a plate, film, or sheet having opaque regions 45 and transmissive regions 50. The transmissive regions 50 of the mask 35 may comprise areas where material is partially or completely removed from the mask 35. Alternatively, the transmissive regions 50 may comprise a substance or material that transmits at least a portion of light in the waveband of the wavefront 15. The opaque regions 45 preferably comprise a substance or material that does not transmit any light in the waveband of the wavefront 15. In certain embodiments, the opaque regions 45 are partially transmissive of light in the waveband of the wavefront 15, but in any event, the amount of light transmitted by the opaque regions 45 is less than the amount of light transmitted by the transmissive regions 50. In other embodiments, the opaque regions 45 transmit light in the waveband of the wavefront 15, but that light is at least partially diffused such that the lenslets 25 corresponding to the opaque regions 45 do not produce focus points 55. Alternatively, in such embodiments, the lenslets 25 corresponding to the opaque regions 45 produce focus points that are sufficiently weak in intensity so as to be distinguished from the focus points 55 corresponding to the transmissive regions.

In certain embodiments, the mask 35 comprises a substrate material that is at least partially transparent to light in the wavefront 15 such as silicon, fused silica, or plastic material. The opaque regions 45 of the mask 35 may comprise a material that is deposited material that is substantially opaque to light in the wavefront 15. For instance a material such as silver or aluminum may be applied to the opaque regions 45 using techniques such as vapor deposition or lithography. In other embodiments, a paint, ink, or other suitable pigment may be applied to one of both sides of the mask 35 to provide the opaque regions 45.

In yet other embodiments, the mask 35 comprises a substrate material that is substantially non-transmissive of light in the wavefront 15 such as a plastic material. In such embodiments, the transmissive regions 50 of the mask 35 may be formed by physically removing some of the substrate material from those regions. Alternatively, the optical properties of substrate material in the transmissive regions 50 may be altered chemically so that those regions of the mask 35 are more transmissive of light in the wavefront 15.

In still other embodiments, the polarization characteristics of the mask 35 are varied such that the opaque regions 45 and the transmissive regions 50 appropriately block and transmit polarized light from the wavefront 15. Alternatively, the transmissive regions 50 of the mask 35 do not directly transmit light from the wavefront 15, but comprise a material, such as a fluorescent dye, that absorbs energy from the wavefront 15 and remits light that is directed to the detector array 30.

In other embodiments, the mask 35 comprises a spatial light modulator (SLM) or similar such device having opaque regions 45 and transmissive regions 50. In such embodiments, the opaque regions 45 are defined as those regions of the SLM in which light from the wavefront 15 passing through the SLM changes polarization by an amount sufficient to substantially preclude transmission through a polarizer located at the output of the SLM. In such embodiments, the transmissive regions 50 are defined as those regions of the SLM in which light from the wavefront 15 passing through the SLM changes polarization by an amount sufficient to be at least partially transmitted by through the polarizer located at the output of the SLM. The SLM may comprise a liquid crystal display (LCD), an array of addressable micro-mirrors, or another similarly such pixelated device that addressably varies one or more optical properties (e.g., polarization, phase, attenuation) over the surface of an incident wavefront.

In certain embodiments, the pattern 40 of the mask 35 is temporally fixed. The term "temporally fixed" as used herein and applied to the pattern 40 refers, without limitation, to a pattern in which the overall shape and size of the pattern and the components thereof (e.g., the opaque regions 45 and the transmissive regions 50 of the mask 35) do not substantially change over time. In certain embodiments, as discussed in greater detail herein below, the pattern 40 of the mask 35 is temporally fixed and spatially variable. The terms "spatially variable" and "varied spatially" as used herein and applied to the pattern 40 refers, without limitation, to a pattern that changes position over time, while the overall shape and size of the pattern and the components thereof remain substantially constant.

The apertures created on the mask 35 by the transmissive regions 50 preferably have substantially the same area and shape as the lenslets 25 when view from the front. Alternatively, each of the transmissive regions 50 may have an area and extent that is smaller than the individual lenslets 25 in the array 20, such as shown for the two-dimensional mask in FIG. 2. In some embodiments, the transmissive regions 50 have a size, shape, and extent consistent with certain performance and/or fabrication constraints.

As illustrated in FIG. 1, the mask 35 may be disposed such that the array 20 of lenslets 25 is between the mask 35 and the detector array 30. In such configurations, it is preferred, but not required, that the transmissive regions 50 do not transmit any light in the waveband of the wavefront 15. Alternatively, the mask 35 may be disposed such that the mask 35 is between the array 20 of lenslets 25 and the detector array 30.

Shack-Hartmann Wavefront Sensor

Figure 4:
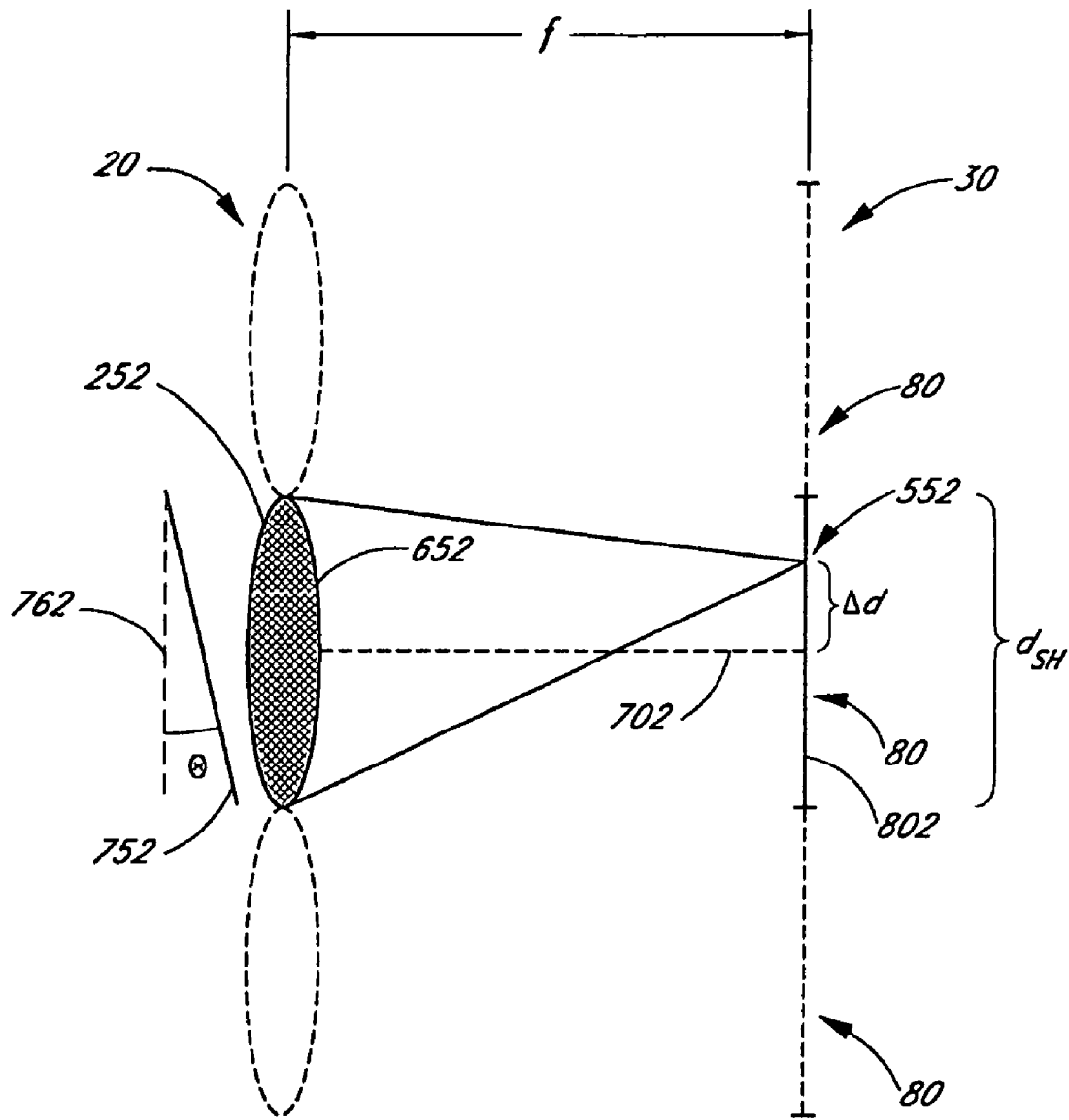
FIG. 4 is a schematic illustration showing a magnified side view of a lenslet and a portion of a detector array for a prior-art Shack-Hartmann wavefront sensor.

FIG. 4 is a schematic illustration showing a magnified side view of a lenslet 25$a$ and a portion of the detector array 30 for a prior-art Shack-Hartmann wavefront sensor illustrating how the lenslets 25$a$ focuses light from a portion 75$a$ of the wavefront 15 onto a detector subaperture 80$a$ of the detector array 30. The detector subaperture 80$a$ has a width $d_{SH}$ along the axis shown in FIG. 4. The lenslet 25$a$ has a nominal focal length of f and a nominal diameter that is substantially equal to the spacing between the lenslets of the lenslet array 20. The lenslet 25$a$ also has an optical axis 70$a$ defined by a line passing through the center of the lenslet 25$a$ and extending in a direction that is approximately normal to the center portion of the back surface 65$a$ of the lenslet 25$a$.

The portion 75$a$ of the wavefront 15 enters the lenslet 25$a$ at an angle θ relative to a line 76$a$ that is substantially perpendicular to the optic axis 70$a$ (for purposes of this illustration, angular component of the portion 75$a$ along a line into the page of FIG. 4 is assumed to be zero). The portion 75$a$ is focused onto the detector subaperture 80$a$ to form a focus point 55$a$ located a distance Δd from the intersection of the optical axis 75$a$ with the detector subaperture 80$a$. The angle θ may be approximately correlated to the distance Δd by the relationship:

$$\theta = a\tan(\Delta d/f) \quad (1)$$

where Δd and f have the same dimensional units. When the angle θ is approximately zero, then Δd is also approximately zero and the focus point 55a is located at the intersection of the optical axis 70a with the detector subaperture 80a. When θ is positive, as shown in FIG. 4, Δd has a positive value that increases as θ increases. In a Shack-Hartmann wavefront sensor it is generally required that the distance Δd be less than one-half the detector subaperture width $d_{SH}$, since a larger value of Δd would mean that the focus point 55a was in the detector subaperture of an adjacent lenslet from the lenslet array, thus producing either an error or an ambiguity.

Figure 5B:
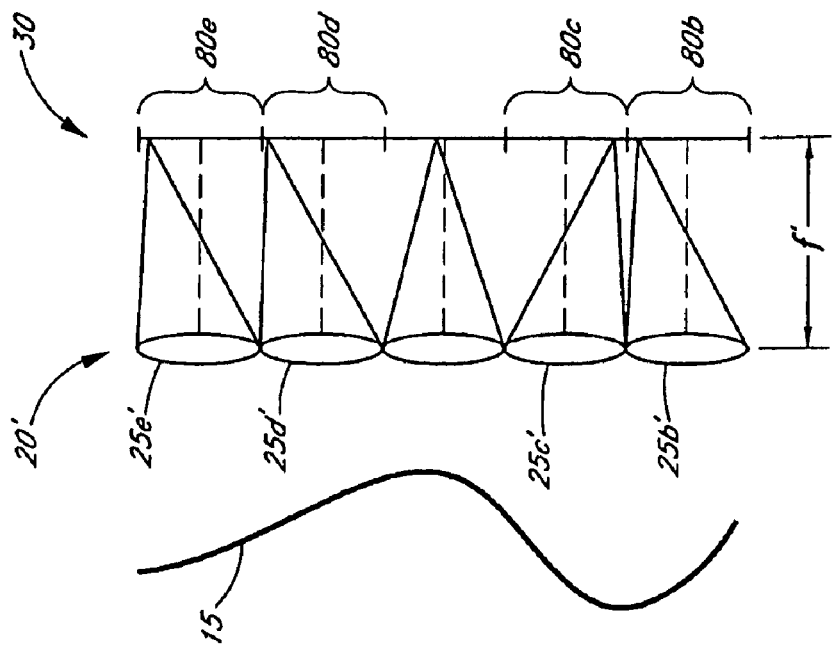
FIG. 5b is a side view of a prior-art Shack-Hartmann wavefront sensor having a larger dynamic range than the wavefront sensor shown in FIG. 4.
Figure 5A:
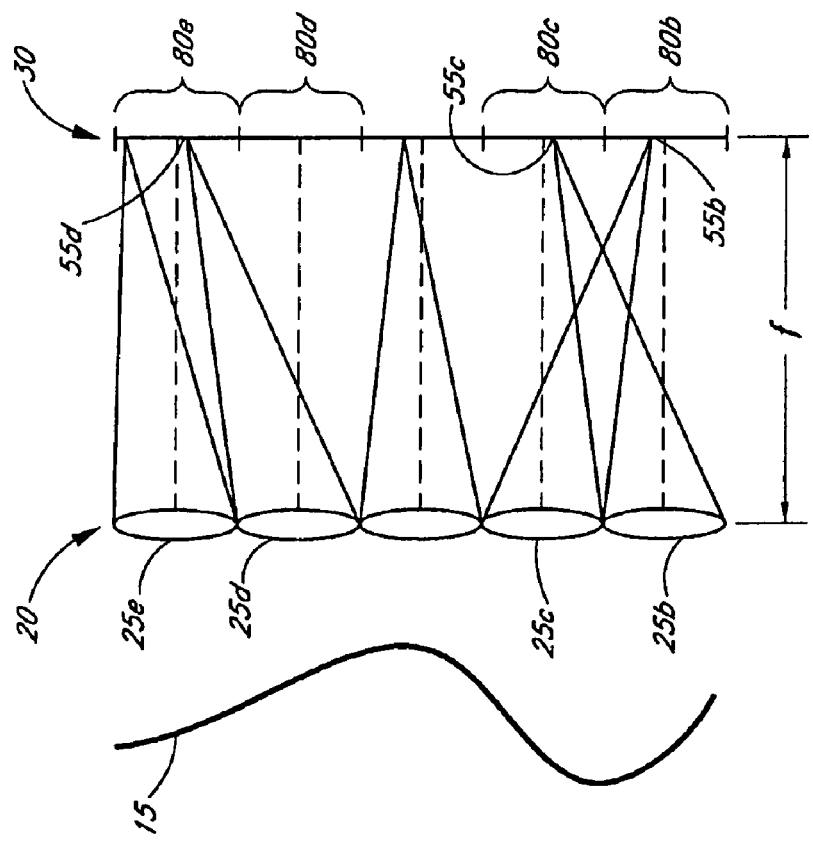
FIG. 5a is a side view of a prior-art Shack-Hartmann wavefront sensor.

FIG. 5a illustrates two possible problems that can be produced using a prior-art Shack-Hartmann wavefront sensor when the incident wavefront has portion in which the slope exceeds a predetermined limit. In the first instance, light from the wavefront 15 is focused by the lenslets 25b and 25c to form the focus points 55b and 55c. However, the location of the focus points 55b, 55c are switched from the expected values and are located inside the detector subaperture 80c and 80b, respectively. This creates an error, since a calculation of the local wavefront slope based on Equation 1 assumes, in this case incorrectly, that the focus point 55b is from light focused by the lenslet 25b and visa versa.

In the second instance, light from the wavefront 15 is focused by the lenslets 25d and 25e to form the focus points 55d and 55e. However, the focus points 55d and 55e are both disposed inside the detector subaperture 80e. This situation creates two ambiguities. First, since there is no focus point inside the detector subaperture 80d, the local slope of the wavefront at the lenslet 25d is indeterminate. Second, since there are two focus points (55d and 55e) inside the detector subaperture 80e, the local slope of the wavefront at the lenslet 25e is also indeterminate, since it cannot be determined which of the focus points 55d, 55e should be used to calculate the local wavefront slope for the portion received by the lenslet 25e.

Other problems of a similar nature may also be produced when the incident wavefront has portion in which the slope exceeds a predetermined limit. For instance, two focus points may completely or partially overlap one another, making it difficult or impossible to either detect or resolve two focus points. In the former case, only one focus point is detected and there are fewer focus points than there are lenslets. Also, a local wavefront slope into one or more of the lenslets 25 may be so great that the some of the focus points may are disposed at locations that are even beyond any of the adjacent detector subapertures.

FIG. 5b illustrates one prior-art method of solving the problems illustrated in FIG. 5a. The prior-art solution is to replace the lenslet array 20 with a different lenslet array 20', wherein each of the lenslets 25' has focal lengths of f' that is less than f Using this approach, light from lenslets 25b', 25c', and 25d' all remain within their corresponding detector subapertures 80b, 80c, and 80d. While the problems associated with large wavefront slope may be resolved with this approach, this approach may also result in a lower slope resolution if the same detector array 30 having the same pixel resolution is used.

Principle of Operation

FIG. 6 may be used to illustrate how the mask 35 can increase the dynamic range of the wavefront sensor 10 as compared to a prior-art Shack-Hartmann wavefront sensor using a detector array equivalent to the detector array 30 and lenslets equivalent to the lenslets 25. FIG. 6 shows a lenslet 25f that may be used to focus light from the wavefront 15 onto the detector array 30. Two lenslets 25g, 25h are disposed to either side of the lenslet 25f. Two more lenslets 25j, 25k are disposed adjacent to the lenslets 25g, 25h, respectively, on the side opposite lenslet 25f. For a traditional Shack-Hartmann sensor not having the mask 35, the detector subapertures 80f, 80g, 80h shown in FIG. 6a represent the portions of the detector array 30 that may be used by the corresponding lenslets 25f, 25g, 25h to focus light from the wavefront 15.

For this illustrative example, each transmissive region 50 has a width that is substantially equal to the spacing s of the lenslets 25, and the transmissive regions 50 are arranged such that every other lenslet 25 from the array 20 focuses light from the wavefront 15 onto the detector array 30. Thus, when the mask 35 is disposed to a first position 85a, as shown in FIG. 6a, the lenslets 25f, 25j, 25k focus light onto the detector array 30, while the lenslets 25g, 25h and a lenslet 25m are prevented from focusing light onto the detector array 30. When the mask 35 is disposed to a second position 85b, as shown in FIG. 6b, the lenslets 25g, 25h, 25m focus light onto the detector array 30, while the lenslets 25f, 25j, 25k are prevented from focusing light onto the detector array 30.

When the mask 35 at the first position 85a, the lenslet 25f focuses light from the wavefront 15 onto the detector array 30, while the adjacent lenslets 25g, 25h are prevented from focusing light from onto the detector array 30 by the opaque regions 45 of the mask 35. Since the adjacent lenslets 25g, 25h do not focus light onto the detector array 30, the portion of the detector array 30 that is available to the lenslet 25f for making wavefront slope measurements is an effective detector subaperture 90f, which is seen to be larger than the detector subaperture 80f.

The extent of the effective detector subaperture 90f along the face of the detector array 30 is from the centers of the adjacent detector subapertures 80g, 80h. The extent of the effective detector subaperture 90f is limited in this way because the adjacent lenslets 25j, 25k utilize the other half of the detector subapertures 80g, 80h, respectively. The size of the effective detector subaperture 90f is approximately twice the size of the detector subaperture 80f (i.e., the subaperture of lenslet 25f without the mask 35). Therefore, in this example, the dynamic range for the lenslet 25f, in terms of the maximum wavefront slope that can be measured, is approximately twice that of an equivalent prior-art Shack-Hartmann wavefront sensor not using the mask 35. In similar fashion, the dynamic range of the other lenslets 25 in the array 20 corresponding to the transmissive regions 50 of the mask 35 (e.g., the lenslets 25j, 25k in FIG. 6a) also have a dynamic range that is approximately twice that of an equivalent prior-art Shack-Hartmann wavefront sensor does not use the mask 35.

Continuing the illustrative example, FIG. 6b shows the mask 35 at the second position 85b. The lenslets 25g, 25h, 25m, which were previously prevented from focusing light from the wavefront 15 onto the detector array 30, now focus light form the wavefront 15 onto the detector array 30, while the adjacent lenslets 25f, 25j, 25k are prevented from focusing light onto the detector array 30. Since the adjacent lenslets 25f, 25j, 25k do not focus light, the dynamic range of lenslets 25g, 25h, 25m also have a dynamic range that is approximately twice that of an equivalent prior-art Shack-Hartmann wavefront sensor does not use the mask 35. Thus, all the lenslets 25 of the array 20 have a dynamic range that is approximately twice that of an equivalent prior-art Shack-Hartmann wavefront sensor does not use the mask 35 (i.e., half the lenslets 25 when the mask 35 is located at the first position 85a and the other half of the lenslets 25 when the mask 35 is located at the second position 85b).

Mask Step Method

In certain embodiment, a method for measuring the wavefront 15, herein referred to as the mask step method, comprises a first step of providing the wavefront sensor 10. The method further comprises a second step of disposing the mask 35 to the first location 85a wherein a first plurality of lenslets (e.g., lenslets 25j, 25f, 25k in FIG. 6) from the array 20 of lenslets 25 focus light from the wavefront 15 onto the detector array 30. The method further comprises a third step of moving the mask 35 to the second location 85b, wherein a second plurality of lenslets 105 (e.g., lenslets 25g, 25h, 25m in FIG. 6) from the array 20 of lenslets focus light from the wavefront 15 onto the detector array 30.

The use of six lenslets 25 in FIG. 6 is for illustrative purposes only. Generally, the number of lenslets 25 in the array 20 is larger than the six lenslets shown in FIG. 6, although the mask step method may be used when the array 20 comprises as few as two lenslets 25. Using the mask step method, each of the lenslets 25 in the array 20 is provided with an effective subaperture (e.g., the effective detector subaperture 90f) that is larger than the subaperture provided by an equivalent prior-art Shack-Hartmann sensor not having the mask 35 (e.g., the detector subaperture 80f).

In certain embodiments, the detector subapertures 80 are in the form of a one-dimensional array and the pattern 40 of the mask 35 is configured as in FIG. 6 wherein every other lenslet of the array 20 focuses light from the wavefront 15 onto the detector array 30. In such embodiments, the mask step method is used once to provide an increased dynamic range compared to a Shack-Hartmann type wavefront sensor that does not use this method.

In other embodiments, the pattern 40 of the mask 35 is configured wherein every nth lenslet of the array 20 focuses light onto the detector array 30. In such embodiments, the third step of the mask step method above may be repeated (n−2) times in order that each lenslets 25 in the array 20 focuses light form the wavefront 15 sometime during the method.

In yet other embodiments, the array 20 of lenslets 25 and detector subapertures 80 are in the form of a two-dimensional arrays and the third step of the mask step method is repeated sufficient times so that each lenslet 25 focuses light from the wavefront 15 at least once during the method. In such embodiments, the pattern 40 of the mask 35 comprises a two-dimensional pattern 40. For example, the mask 35 illustrated in FIG. 2 comprises the two-dimensional pattern 40 shown and may be used in conjunction with the 5.times.5 array 20 of lenslets 25 shown in FIG. 3.

Two-dimensional Mask Step Method

FIG. 7 may be used to illustrate one method of using the two-dimensional pattern 40 of the mask 35 shown in FIG. 2. Since FIG. 7 is a front view of the wavefront sensor 10, the wavefront 15 is not shown. Likewise, the detector array 30 is not shown in FIG. 7 since it is located behind and, therefore, hidden by the mask 35 and the array 20 of lenslets 25.

Referring to FIG. 7, a preferred embodiment of the present disclosure comprises a method for measuring the wavefront 15, wherein the mask 35 comprises a two-dimensional pattern 40. The method, referred to herein as the two-dimensional mask step method, comprises a first step of providing the wavefront sensor 10. The method further comprises a second step of disposing the mask 35 to a first location (e.g., that shown in FIG. 7a), wherein a first plurality of lenslets 110 from the array 20 focuses light from the wavefront 15 onto the detector array 30. The method further comprises a third step of moving the mask 35 to a second location (e.g., that shown in FIG. 7b), wherein a second plurality of lenslets 115 from the array 20 focuses light from the wavefront 15 onto the detector array 30. The method further comprises a fourth step of moving the mask 35 to a third location (e.g., that shown in FIG. 7c), wherein a third plurality of lenslets 120 from the array 20 focuses light from the wavefront 15 onto the detector array 30. The method further comprises a fifth step of moving the mask 35 to a fourth location (e.g., that shown in FIG. 7d), wherein a fourth plurality of lenslets 125 from the array 20 focuses light from the wavefront 15 onto the detector array 30.

The two-dimensional mask step method utilizes a mask 35 having a temporally fixed pattern 40 that is spatially varied by moving the mask 35 to four different locations. During steps 2-5 of the method, the mask 35 is moved such that each transparent region 50 defines a 2.times.2 sub-array of lenslets 25, wherein each lenslet 25 in the sub-array successively focus light from the wavefront 15 onto the detector array 30. Using the method, each of the lenslets 25 in the array 20 has a corresponding effective detector subaperture 90 that has approximately four times more area on the detector array 30 than the corresponding detector subaperture 80 provided by an equivalent prior-art Shack-Hartmann sensor not utilizing the two-dimensional mask step method. Thus, the wavefront sensor 10 is able to measure larger wavefront slopes without ambiguity than the equivalent Shack-Hartmann sensor that does not incorporate the mask 35.

The two-dimensional mask step method, using the pattern 40 shown in FIG. 2, may be used to remove ambiguities produced by prior-art Shack-Hartmann sensors occurring when local wavefront slopes cause light received by a lenslet to be focused onto the subaperture of an adjacent lenslet. Using the pattern 40 shown in FIG. 2, no ambiguity is produced so long as the focused light does not lie beyond the center of an adjacent subaperture corresponding to an adjacent lenslet. For example, if the mask 35 shown in FIG. 6 represents one row or column of a two-dimensional pattern 40, the two-dimensional mask step method produces no ambiguity when the focus point 55f produced by the lenslet 25f does not lie beyond the point 130 on the detector subaperture 80g, wherein the point 130 represents the intersection of detector array 30 with the optical axis of the lenslet 25g.

Modified Two-Dimensional Mask Step Method

In certain embodiments, the temporally fixed pattern 40 is configured such that the two-dimensional pattern 40 comprises a set of m transmissive regions 50 configured such that the spacing between the transmissive regions 50 along each of two orthogonal axes is every nth lenslet 25 of the array 20. Using this pattern the mask 35 may be moved in such a manner that each transparent region 50 defines an area that covers an n×n sub-array of lenslets 25, wherein each lenslet 25 in the n×n sub-array successively focus light from the wavefront 15 onto the detector array 30. In certain embodiments, such a pattern 40 is used in conjunction with modified version of the two-dimensional mask step method, referred to herein as the modified two-dimensional mask step.

The modified two-dimensional mask step method comprises a first step of providing the two-dimensional pattern 40 on the mask 35 having the set of m transmissive regions 50 configured such that the spacing between the transmissive regions 50 along each of two orthogonal axes is every nth lenslet 25 of the array 20. The size of each transmissive region is preferably substantially equal to that of an individual lenslet 25. The method comprises a second step of disposing the mask 35 to the first location wherein a first plurality of lenslets 25 from the array 20 focus light from the wavefront 15 onto the detector array 30. The method further comprises a third step of moving the mask 35 to ($n^2-1$) different positions such that each of the m transmissive regions 50 allows light from the wavefront 15 to be focused onto the detector array 30 by each lenslet 25 within an n×n sub-array of lenslets 25.

Using the modified two-dimensional mask step method, each of the lenslets 25 in the array 20 has a corresponding effective detector subaperture 90 that has approximately $n^2$ times more area on the detector array 30 than the corresponding detector subaperture 80 provided by an equivalent prior-art Shack-Hartmann sensor not utilizing the two-dimensional mask step method. Thus, the wavefront sensor 10 is able to measure larger wavefront slopes without ambiguity than the equivalent Shack-Hartmann sensor that does not incorporate the mask 35.

When using the either the two-dimensional mask step method or the modified two-dimensional mask step method, the mask 35 may be located either in front of or behind the array 20 of lenslets 25. Other methods utilizing different algorithms for moving the mask 35 may alternatively be used in conjunction with the various embodiments of the temporally fixed patterns 40 discussed above herein. Also, different embodiments of the temporally fixed patterns 40 may be used to increase the dynamic range of the device 10 over prior-art Shack-Hartmann wavefront sensors not utilizing the mask 35.

In certain embodiments, the mask 35 comprises an SLM and the two-dimensional, temporally fixed pattern 40 is produced by addressing the pixels of the SLM in a predetermined manner using an appropriate electronic input into the SLM. In such embodiments, the pattern 40 is spatially varied by varying the electronic input into the SLM in a predetermined manner such that the pattern 40 is moved spatially, but is unchanged in terms of the overall shape and size of the pattern and the components thereof.

Point Ambiguity Elimination Method

FIG. 8 may be used to describe another embodiment of the present disclosure, wherein a method for measuring the wavefront 15 comprises a first step of providing the wavefront sensor 15 and disposing the array 20 of lenslets 25 such that two of lenslets 25n, 25p are capable of focusing light from the wavefront 15 onto a point P on the detector array 30. The method additionally comprises a second step of disposing the mask 35 such that only one of the two lenslets 25 focuses light from the wavefront 15 onto the point P.

Figure 8B:
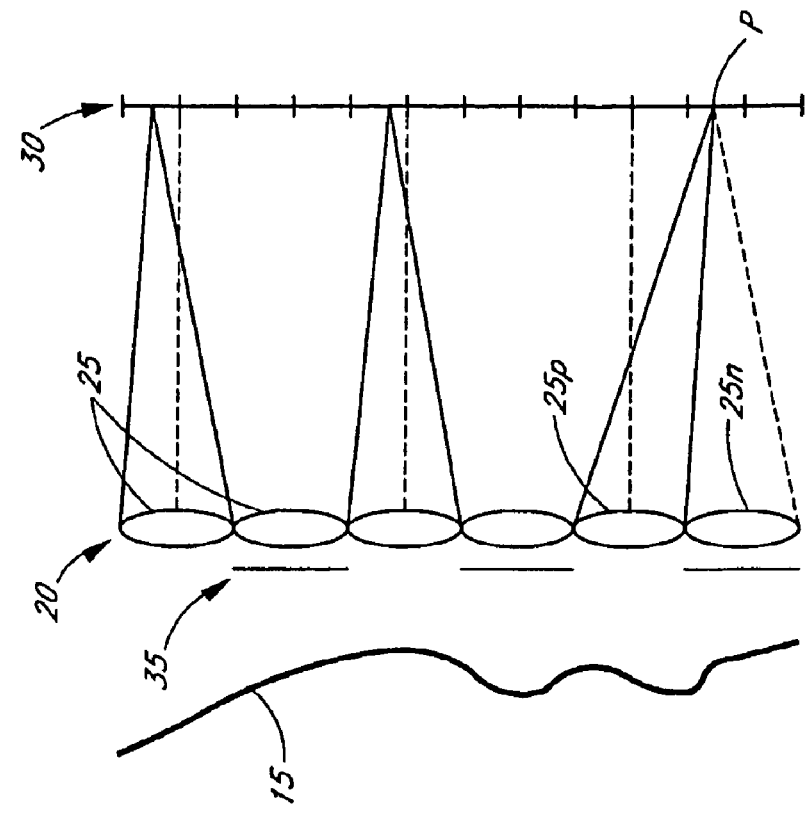
FIG. 8 is a side view of wavefront sensor according to another embodiment of the present disclosure.
Figure 8A:
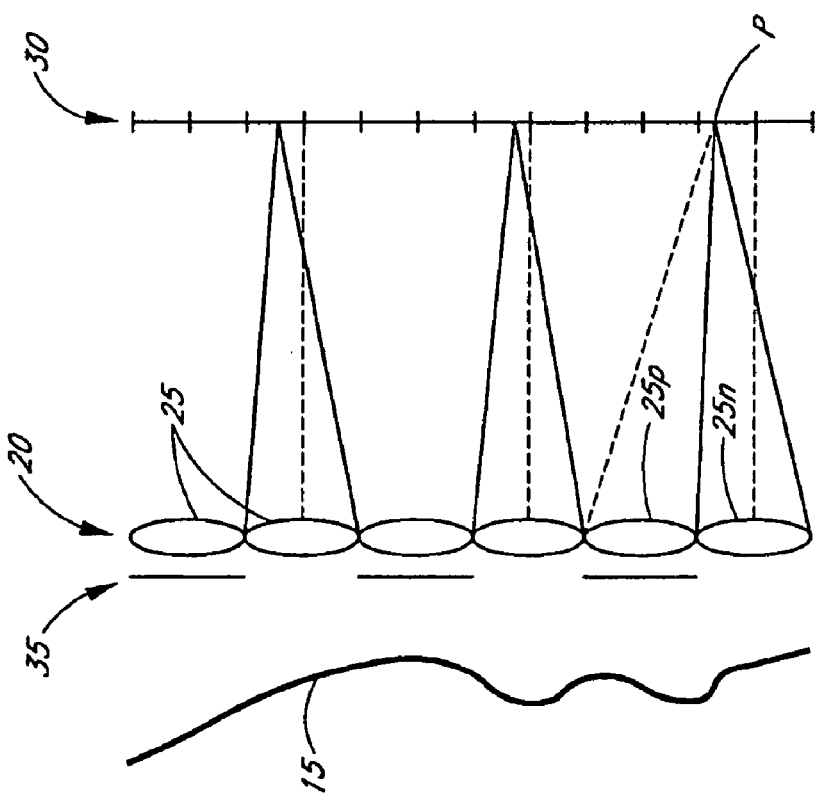

As illustrated in FIG. 8, the wavefront 15 is disposed such that the lenslets 25n, 25p are both capable of focusing light onto the point P on the detector array 30. In FIG. 8a the mask 35 is positioned so that only light from the wavefront 15 entering the lenslet 25n is focused onto the point P. The dotted line from lenslet 25p indicates light from the wavefront 15 that would be focused to the point P on the detector array 30 if the mask 35 were removed or moved to another position such as that shown in FIG. 8b. In FIG. 8b the mask 35 is positioned so that only light from the wavefront 15 entering the lenslet 25p is focused onto the point P. The dotted line from lenslet 25n indicates light from the wavefront 15 that would be focused to the point P on the detector array 30 if the mask 35 were removed or moved to another position such as the position shown in FIG. 8a.

Using the two different positions of the mask 35, it can be determined that the light contained in the point P is produced by light from the wavefront 15 that is focused by both the lenslet 25n and the lenslet 25p. Therefore, the signal produced by focused light at the point P on the detector array 30 may be used to determine the average slope of the wavefront 15 within the areas corresponding to the lenslets 25n, 25p.

Single Aperture Method

Figure 9B:
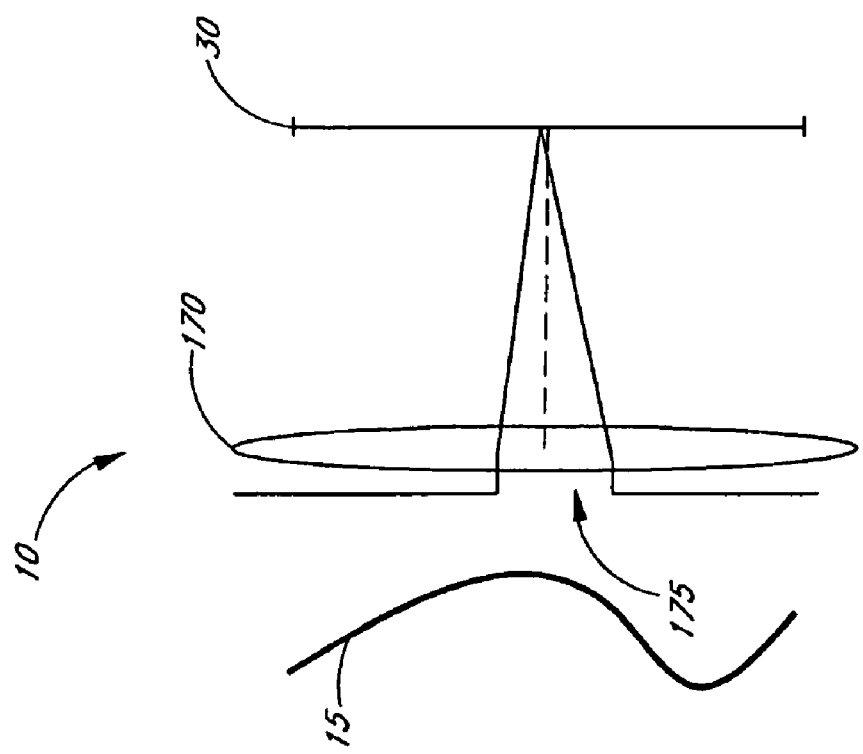
FIG. 9 is a side view of wavefront sensor comprising a single lens and a mask having a single aperture.
Figure 9A:
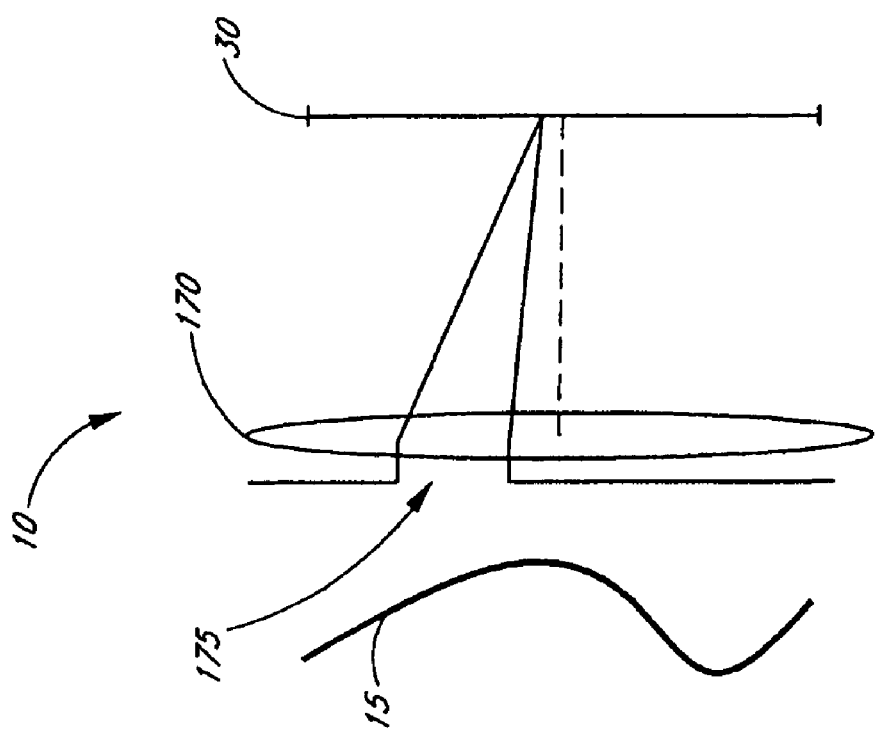

In certain other embodiments, such as that shown in FIG. 9, the array 20 of lenslets 25 is replaced by a single lens 170 and the wavefront sensor 10 contains a mask 35 that comprises an aperture 175 adapted to transmit from light from the wavefront 15. The lens 170 preferably has a diameter that is at least equivalent to the largest dimension of the array detector 30 (e.g., the diagonal length of a rectangular or square array detector). The lens 170 may be a refractive element comprising a single material or a achromatic lens comprising two or more materials. Alternatively, the lens 170 may any suitable imaging optical element such as a compound lens, curved mirror, holographic optical element, or diffractive optical element.

The aperture 175 is typically circular or square with a diameter that is sufficiently small so that light from only a small portion of the wavefront 15 is received by lens 170. The diameter of the aperture 175 is preferably less than about 3 millimeter, more preferably less than about 1 millimeter, and even more preferably less than about 500 micrometers.

The wavefront sensor 10 schematically illustrated in FIG. 9 may be used in a method for measuring a wavefront comprising a first step of providing a wavefront sensor 10 that comprises the detector array 30, the lens 170, and the mask 35 having the aperture 175. The method additionally comprises a second step of disposing the mask 35 to a first location, wherein light from a first portion of the wavefront 15 is transmitted by the aperture 175 and is focused by the lens 170 onto the detector array 30 to produce a first signal. The method further comprises a third step of moving the mask 35 to a second location, wherein light from a second portion of the wavefront 15 is transmitted by the aperture 175 and is focused by the lens 170 onto the detector array 30 to produce a second signal. The method also comprises a fourth step of using the first signal to determine the slope of the first portion of the wavefront 15 and using the second signal to determine the slope of the second portion of the wavefront 15.

SLM Methods

Figure 10:
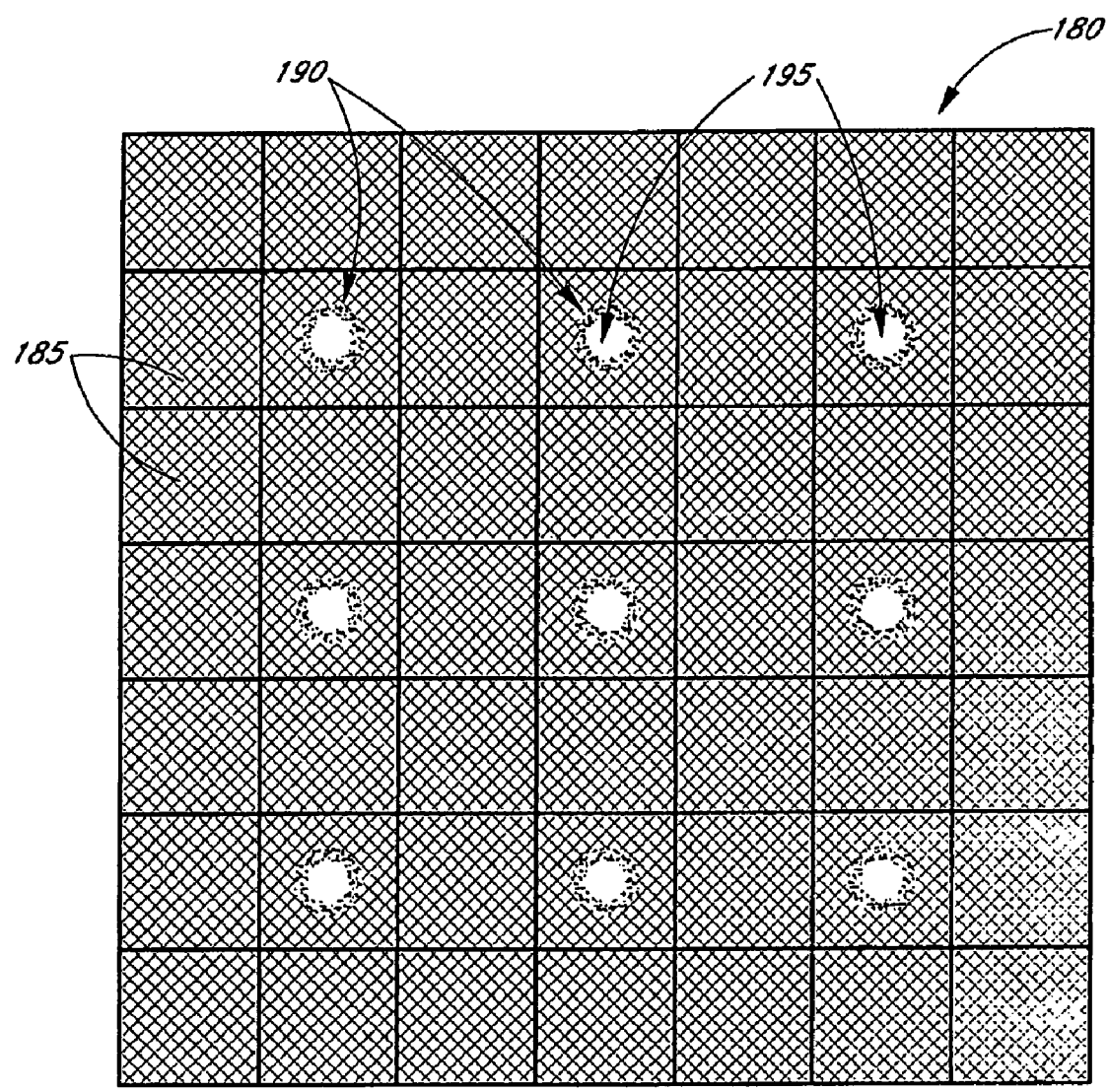
FIG. 10 is a front view of a spatial light modulator having regions that form lenslets that focus light and other regions that block light.

In certain embodiments, such as that shown in FIG. 10, the array 20 of lenslets 25 is incorporated into the mask 35. In such embodiments, the wavefront sensor 10 comprises an SLM 180 having a first plurality of zones 185 and a second plurality of zones 190. The first plurality of zones 185 is adapted to substantially block light from a first portion of the wavefront 15 (not shown) such that light from the first portion of the wavefront 15 is not received by the detector array. The second plurality of zones 190 is adapted to form a plurality of focusing elements 195 that focus light form the wavefront 15 to produce a corresponding plurality of foci on the detector array 30. The plurality of foci produces a plurality of signals that may be used for estimating the slope at a plurality locations on the wavefront 15 corresponding to the locations of the plurality of focusing elements 165. The SLM 180 may be alternatively used in any of the previous embodiments of the wavefront sensor 10 disclosed above herein to replace the mask 35 and the array 20 of lenslets 25. The SLM 180 may also be for any of the methods discussed above herein utilizing the wavefront sensor 10.

Optical Layout and Results

Figure 11:
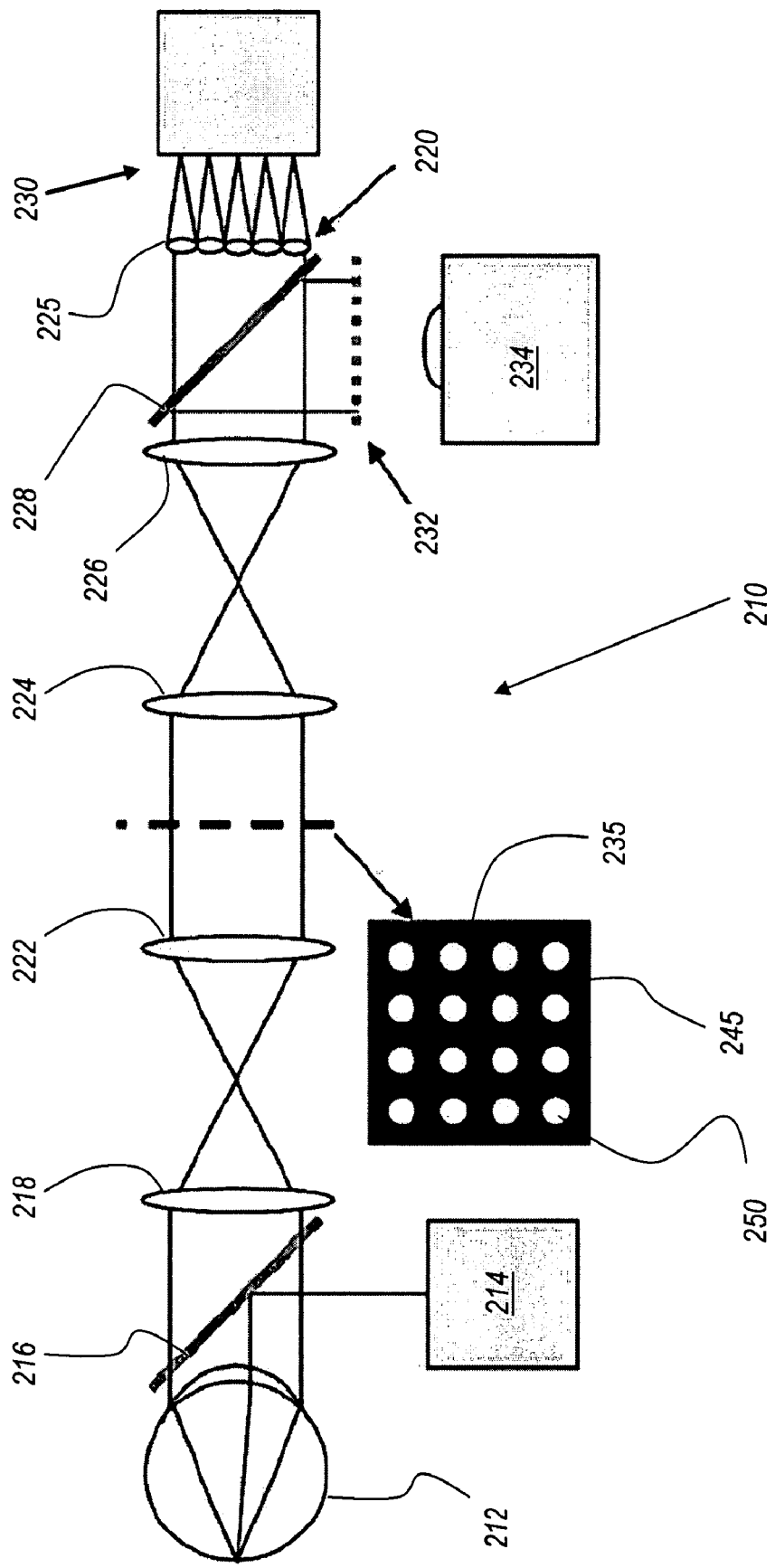
FIG. 11 is a schematic view of an embodiment of an optical layout of a wavefront sensor.

Some embodiments are illustrated in FIG. 11, which depicts an optical layout of a large dynamic wavefront sensor 210. Embodiments described hereafter use like numeral references to embodiments described above and operate in a similar manner except as explained below. In some embodiments, the wavefront sensor 210 is configured to superimpose at least a mask 235, or a translatable plate, and at least one lenslet 225 of a lenslet array 220 onto a plane conjugate with the pupil of an eye 212. The co-alignment of the mask 235, lenslet array 220, and pupillary planes facilitate proper orientation of the mask 235 with respect to the pupil and the lenslet array 220. The mask 235 preferably includes, as explained above, opaque regions 245 and transmissive regions 250. Co-alignment of the planes also permits proper alignment of the light passing through transmissive regions 250 of the mask 235 with respect to the individual lenslets 225 of the lenslet array 220. The alignment also permits proper alignment of the mask 235 and lenslet array 220 with light emanating from the pupil of the eye.

As illustrated in FIG. 11, the sensor 210 preferably includes a light source 214 that emits a light (for example, from a laser or superluminescent diode) that is reflected by half-mirror 216 into the eye 212. The cornea and lens of the eye 212 focus the light to a point on the retina, which light is then reflected back through the pupil and out the eye as an aberrated wavefront. The wavefront passes through the half-mirror 216 and through a first optical relay system that preferably includes first and second lenses 218, 222. The wavefront passes through the mask 235, which includes selectively positioned apertures, or transmissive regions 250, that correspond with respective lenslets 225. The first and second lenses 218, 222 optically co-align, or superimpose, the pupillary plane with that of the mask 235. The light preferably passes through a second optical relay system that preferably includes third and fourth lenses 224, 226, at which point the light is split by another half-mirror 228. The light reflected by the half-mirror 228 is projected onto a reticle 232, which provides an image of the pupil for a pupil camera 234. The light that passes through the half-mirror 228 then passes through at least one lenslet 225 of a lenslet array 220. As described above, the light is focused onto a detector array 230. The third and fourth lenses 224, 226 optically co-align the mask 235 and pupillary plane with the lenslet array 220, depicting at least one lenslet 225, and the pupil camera 234 such that the planes are co-aligned on a pupillary conjugate plane. Accordingly, the mask 235, the lenslet array 220, and the pupil camera 235 are optically superimposed on a plane conjugate with the pupil.

The pupil camera 234 obtains an image from the reticle 232 that depicts, when the mask 235 is in position, the mask 235 superimposed on a plane conjugate with the pupil of the eye 212, or a pupillary conjugate plane. The light passing through the apertures, or transmissive regions 250, of the mask 235 correspond to the light that passes through the lenslets 225 of the lenslet array 220. Thus, when the pupil camera 234 obtains the image that is reflected from the half-mirror 228 onto the reticle 232, the image depicts the mask 235 superimposed on a plane conjugate with the pupil. The image can facilitate proper orientation of the mask 235 with respect to the lenslets 225 of the lenslet array 220. This permits, among other things, accurate blocking of the lenslets 225 and increased measurement sensitivity and sampling resolution of aberrations.

Figure 12:
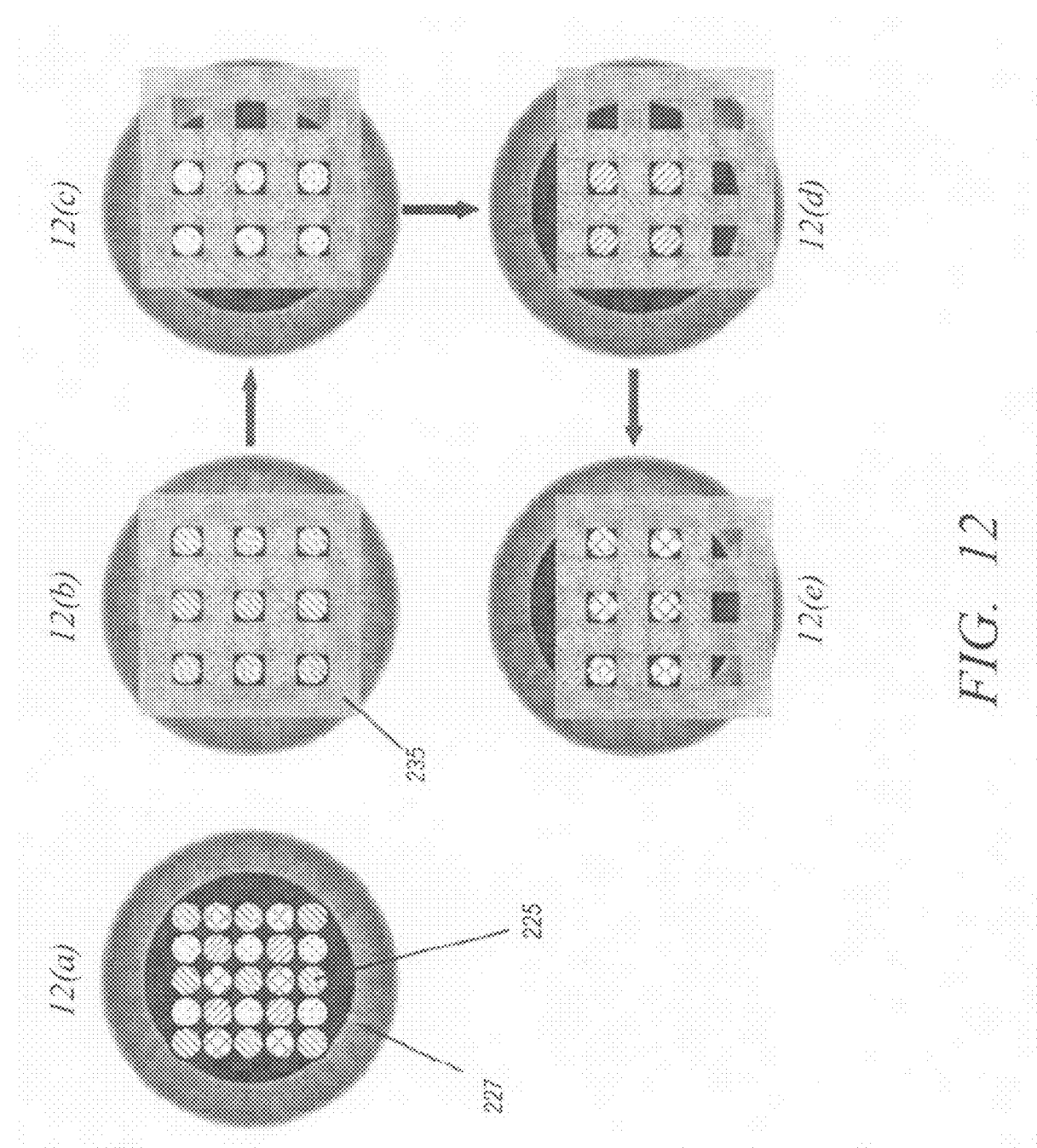
FIG. 12 depicts an image produced by optically superimposing a lenslet array and a mask on a pupillary conjugate plane.

In some embodiments, the mask 235 is configured to block every other lenslet 225 of the array 220 such that the translations of the mask 235 as described above, and illustrated in FIG. 12 will permit the light passing through each lenslet 225 to be obtained and evaluated. FIG. 12 depicts the process of obtaining the light passing through each lenslet 225 of the array 220 with the mask 235 and the lenslet 225 superimposed on the pupillary conjugate plane, as obtained by the pupil camera 234. FIG. 12($a$) depicts the lenslet array 220 superimposed on the pupillary conjugate plane, depicting the individual lenslets 225 and the pupil surrounded by the iris 227 of the eye. FIG. 12($b$) depicts the image of FIG. 12($a$) with the mask 235 in a first position also superimposed on the pupillary conjugate plane. FIG. 12($c$) depicts the mask 235 after a first translation of the mask 235. FIG. 12($d$) depicts the mask 235 in a third position following a second translation, and FIG. 12($e$) depicts the mask 235 in a fourth position following a third translation.

The translatable mask 235 increases a virtual centroiding area that each spot of focused light is allowed to fall within on the detector array 230, as described above. In the above-described sensor 210, the virtual centroiding area is increased by a factor of two. After the light pattern is captured, the translatable mask 235 is translated by one lenslet 225 spacing to capture the second light pattern that includes light patterns blocked by the plate previously. In 2-D space, each complete measurement consists of four images after each of the three translations of the plate in horizontal and vertical directions, depicted in FIG. 12. A centroiding algorithm can be applied to each image to detect displacements of the light from reference positions. The displacement data can from the four images can then be combined together in the proper order, which can be determined from the original lenslet array 220 configuration and the direction of the translations. From the combined displacement data, Zernike coefficients are computed.

As depicted in FIG. 12, the translatable mask 235, lenslet array 220, and pupil camera 234 are preferably all co-aligned optically onto planes conjugate with the pupil. This is preferably done using two optical relay systems that each consist of a pair of imaging lenses. In some embodiments, all four lenses 218, 222, 224, 226 have substantially equivalent focal lengths, resulting in a one-to-one pupil magnification on the lenslet array. The lenslet array 220 is also preferably placed in conjugate with the pupil, the translatable mask 235 and lenslet array 220 are optically superimposed onto the same plane, which allows for blocking of each lenslet 225 accurately. In some embodiments, the light source 214 includes a broadband superluminescent diode having a wavelength of about 830 nm that is used to generate a laser beacon on the retina. In some embodiments, the size and focal length of the lenslets 225 are about 400×400 μm and about 10.2 mm, respectively. In some embodiments, lenslets 225 can have varying sizes and focal lengths. In some embodiments, the lenslets 225 can have dimensions that range from about 50 μm to about 1000 μm. In some embodiments, the lenslets 225 can have dimensions less than about 50 μm and greater than about 1000 μm. In some embodiments, the lenslets 225 can have dimensions that range from about 200 μm to about 600 μm. In some embodiments, the focal lengths of the lenslets can range from between about 2 mm to about 50 mm. In some embodiments, the lenslets can have focal lengths that range from about 5 mm to about 20 mm. In some embodiments, the lenslet focal lengths can be less than 2 mm and greater than 50 mm. In some embodiments, the lenslet array 220 combined with the translatable mask 235 permits measurements of up to about ±10D corresponding to a peak-to-valley value of 45 μm for a 6-mm pupil or up to about ±8 μm of Zernike coma, Z(±1,3).

Figure 13:
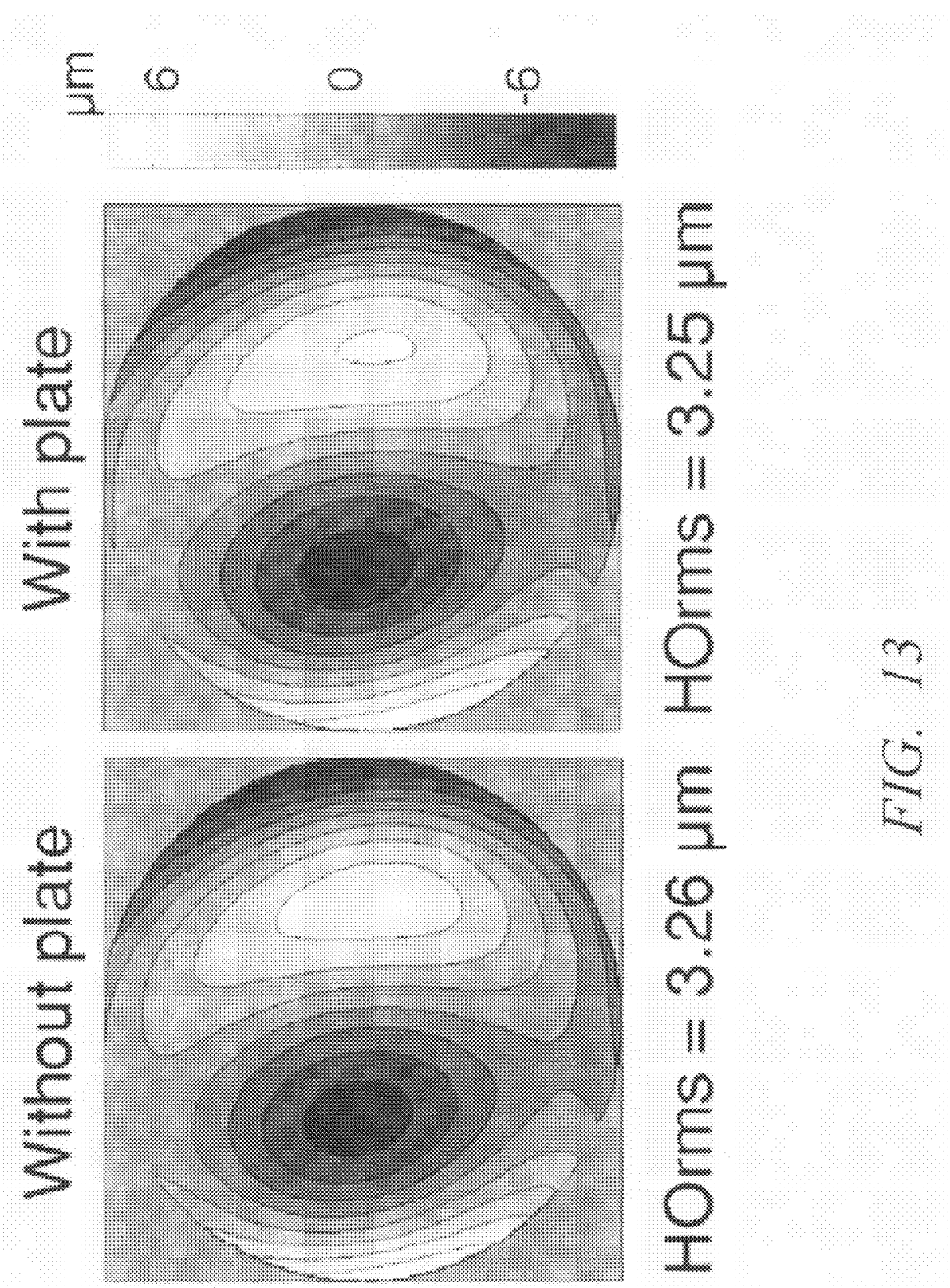
FIG. 13 depicts the measured static higher order aberrations comparing that obtained with a mask and that obtained without a mask.

In one example of an application of the sensor 210, the procedure first measured the static aberration induced by a custom-made phase plate that had various kinds of higher order ($3^{rd}$ order and above) aberrations based on the actual aberration of an abnormal eye. This aberration was chosen because it has relatively large amounts of higher order aberrations that can still be measured with and without the translatable mask 235. Results of such a procedure are described in Yoon, Geunyoung, "Large-Dynamic-Range Shack-Hartmann Wavefront Sensor for Highly Aberrated Eyes," Journal of Biomedical Optics, pp. 030502-1-030502-3, 2006, the entirety of which is incorporated herein by reference to the extent it does not contradict the disclosure herein. FIG. 13 depicts the measured higher order aberrations with and without the translatable mask 235 for a 6-mm pupil. HOrms indicates higher order root-mean-square (RMS). As depicted in FIG. 13, the most dominant higher order aberration was horizontal coma. The difference in all the higher order Zernike coefficients between the measurements with and without the translatable mask 235 was insignificant and the wavefront maps generated from those coefficients were very similar. The higher order wavefront RMS values with and without the translatable mask 235 were 3.25 μm and 3.26 μm, respectively. This small difference could be due in part to the difference in an aperture shape between lenslets (square) and clear apertures (circular) on the translatable mask 235, which induced slightly different averaged wavefront slopes within the apertures, or transmissive regions.

Figure 14:
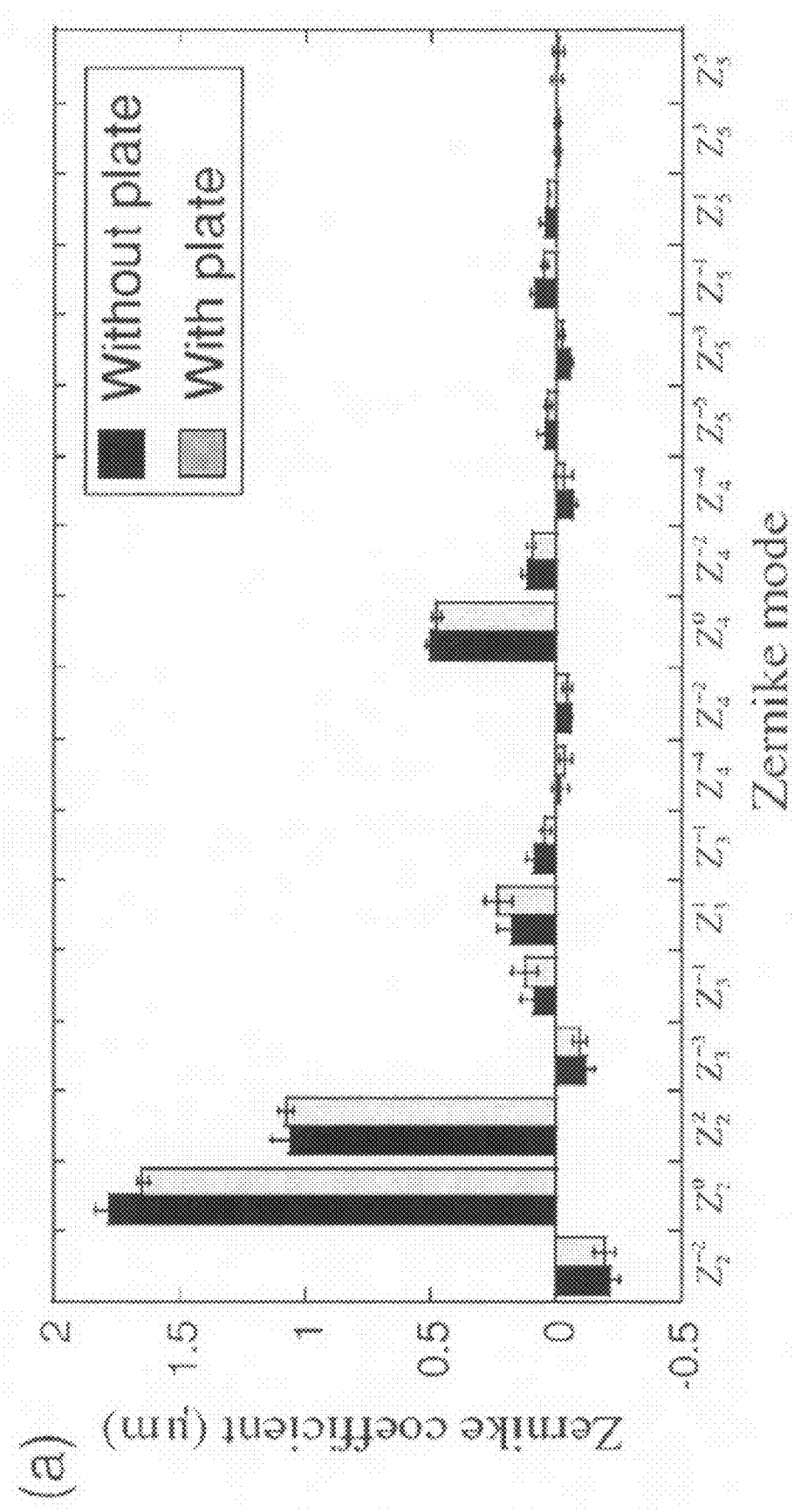
FIG. 14 is a graph that depicts calculated Zernike coefficients, which reflect the measured higher order aberrations of a human eye with and without a translatable mask.
Figure 15:
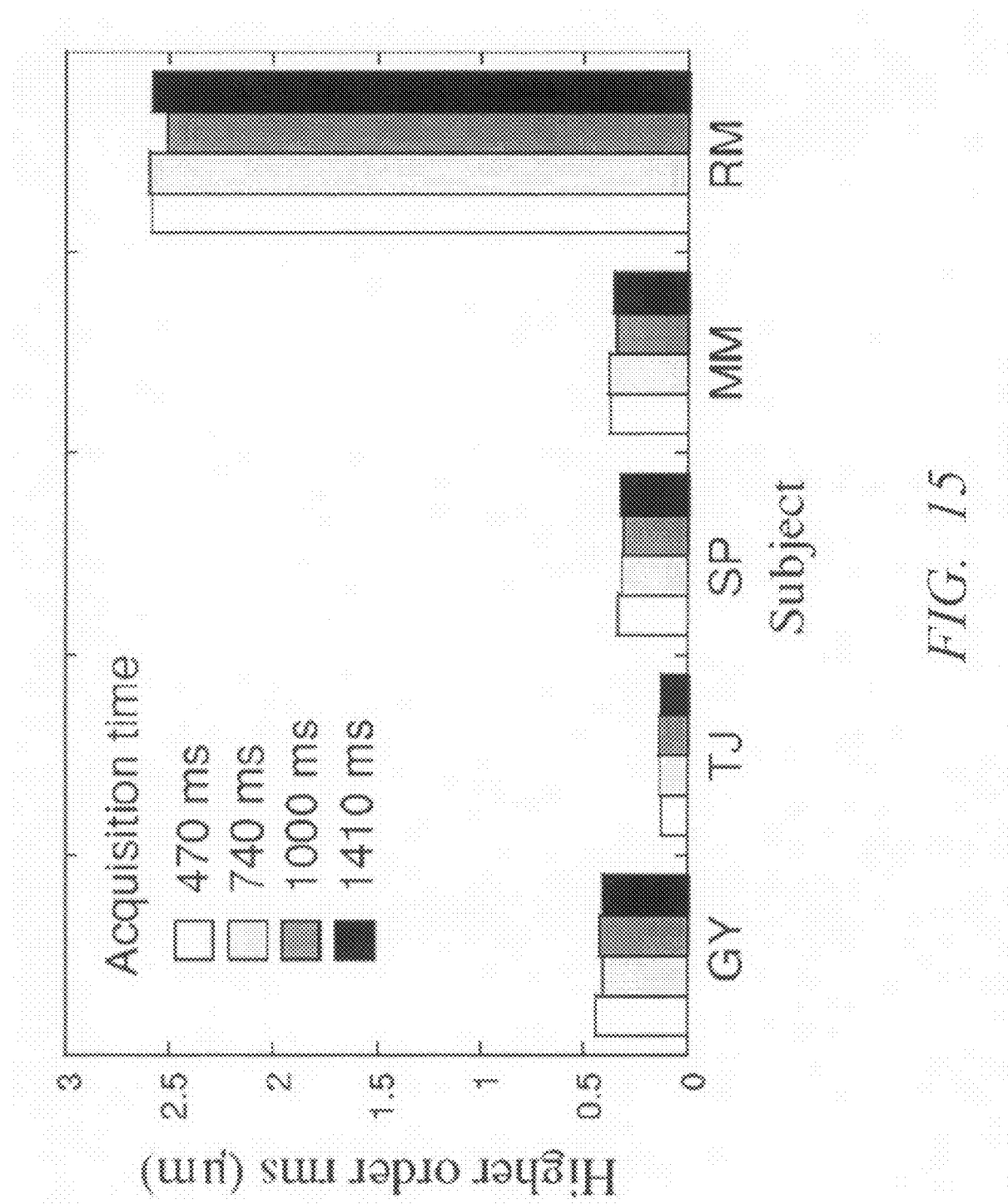
FIG. 15 is a graph that depicts the variability of the measured higher order wavefront RMS when using different total acquisition times for four normal eyes and one keratoconic eye (RM).

In a further example of an application of the sensor 210, eye movement effects that might occur while the translatable mask 235 is translated in horizontal and vertical directions were compared with those of procedures without the translatable mask 235. Measurement reliability of the sensor 210 might be decreased if there is significant eye movement causing pupil decentration. One normal eye's aberration was measured with and without the translatable mask 235 at the same CCD exposure time of 50 ms. Since the large-dynamic-range wavefront sensor 210 requires three more additional CCD exposures, total acquisition time including the time required to translate the mask 235 was approximately five times longer (470 ms) than the conventional wavefront sensor. Four measurements were made and averaged for both cases. FIG. 14 depicts a direct comparison of individual higher Zernike coefficients as well as the wavefront maps generated from the Zernike data with and without the translatable mask 235. A slight but statistically significant difference (0.13 μm) in defocus with and without the mask 235 was found. The higher order RMS values with and without the mask 235 were 0.59 and 0.58 μm, respectively. The difference between individual coefficients for both cases was within a typical measurement variability observed with a conventional wavefront sensor and was not statistically significant. With increased total acquisition time in analysis of an increased effect of eye movements on the measured aberration of four normal eyes and one keratoconic eye. FIG. 15 plots the measured higher order RMS when different total acquisition times were used. For acquisition times up to 1410 ms, the higher order RMS values are insignificantly different for all five subjects including one keratoconic eye (RM). A variability of higher order RMS values for the subjects were evaluated by computing the mean of the standard deviation of the higher order RMS for the individual subjects, which was 0.028±0.024 μm (mean±standard deviation). This result indicates that eye movements, at least those occurring up to 1410-ms total acquisition time, do not significantly affect the aberration measurement using the large-dynamic-range wavefront sensor.

In some embodiments, the wavefront sensor 210 increases the dynamic range even more without sacrificing measurement sensitivity by blocking more adjacent lenslets 225, and decreased translation time can further enhance combination of the large-dynamic-range wavefront sensor with a real-time adaptive-optics closed loop. In some embodiments, the sensor 210 has one clear aperture on the translatable plate and scans the entire pupil sequentially, which allows individual spots to have a centroiding area the same as a detector size, thus resulting in a greatly increased dynamic range. Normal eyes can also be reliably measured using the large-dynamic-range wavefront sensor; measurement sensitivity remains the same for both cases. The ability to measure reliably the highly aberrated eyes also makes it possible to correct their higher order aberrations to enhance visual performance substantially. The same method can also be used for optical testing of lenses and mirrors with large amounts of higher order aberrations.

It is to be understood that the present disclosure is not to be limited to the specific embodiments or methods described in this specification or illustrated in the drawings, but extend to other arrangements, technology, and methods, now existing or hereinafter arising, which are suitable or sufficient for achieving the purposes and advantages hereof.

What is claimed is:

1. A device, for measuring a wavefront, comprising:
   a detector array configured to detect light passing through an array of lenslets; and
   a mask having a fixed pattern comprising an opaque region that is substantially opaque to light from the wavefront and a transmissive region that is transmissive of light from the wavefront;
   wherein the mask and at least one of the lenslets are optically superimposed on a plane conjugate with a pupil of an eye; and
   wherein the mask is configured to be selectably disposed to any one of a plurality of positions and the mask and the array of lenslets are disposed such that light from the wavefront that is transmitted by the transmissive region is focused onto the detector array by the array of lenslets.

2. The device of claim 1, wherein the device further optically superimposes a pupil camera on a plane conjugate with the pupil of the eye.

3. The device of claim 1, wherein the device comprises an optical relay system that optically superimposes the mask and at least one lenslet on a plane conjugate with the pupil of the eye.

4. The device of claim 2, wherein the device comprises a plurality of optical relay systems that optically superimposes the mask and at least one lenslet on a plane conjugate with the pupil of the eye.

5. The device of claim 4, wherein at least two optical relay systems each comprise a pair of imaging lenses that have substantially equivalent focal lengths.

6. The device of claim 1, wherein the array of lenslets is disposed in a two-dimensional grid that samples at least a portion of the wavefront.

7. The device of claim 1, wherein the array of lenslets has a fill factor of one or less.

8. The device of claim 7, wherein the lenslets forming the array of lenslets are spaced substantially equally from one another.

9. The device of claim 1, wherein the mask comprises two or more transmissive regions that are transmissive of light from the wavefront.

10. The device of claim 9, wherein the fixed pattern is configured such that the spacing between the transmissive regions along each of two orthogonal axes is every nth lenslet of the array, where n is greater than or equal to two.

11. The device of claim 10, wherein n is equal to two.

12. The device of claim 9, wherein the fixed pattern is configured such that the spacing between the transmissive regions is every nth lenslet of the array, where n is greater than or equal to two.

13. The device of claim 12, wherein n is equal to two.

14. The device of claim 1, wherein the detector array is a charge coupled device (CCD) or a complementary metal oxide semiconductor (CMOS) detector array.

15. A method, for measuring a wavefront, comprising:
providing a wavefront sensor containing a detector array, an array of lenslets, and a mask having a fixed pattern containing one or more opaque regions that are substantially opaque to light from the wavefront and one or more transmissive regions that are transmissive of light from the wavefront;
optically superimposing the mask and at least one lenslet onto a plane conjugate with a pupil of an eye;
disposing the array of lenslets such that at least one lenslet from the array of lenslets is configured to focus light from the wavefront onto the detector array; and
moving the mask to block transmission of light from the wavefront to at least one lenslet of the lenslet array.

16. The method of claim 15, further comprising optically superimposing a pupil camera onto a plane conjugate with the pupil of the eye.

17. The method of claim 15, wherein mask and at least one lenslet are optically superimposed on a plane conjugate with the pupil of the eye by an optical relay system.

18. The method of claim 15, wherein mask and at least one lenslet are optically superimposed on a plane conjugate with the pupil of the eye by a plurality of optical relay systems, at least two of the plurality of optical relay systems comprising a pair of imaging lenses that have substantially equivalent focal lengths.

19. A device, for measuring a wavefront, comprising:
a detector array configured to detect light passing through an array of lenslets, the array of lenslets comprising a grid pattern having five rows by five columns of lenslets; and
a mask having a fixed pattern comprising an opaque region that is substantially opaque to light from the wavefront and a transmissive region that is transmissive of light from the wavefront, the fixed pattern further comprising a grid pattern having three rows by three columns of transmissive regions;
wherein the mask is configured to be selectably disposed to any one of a plurality of positions and the mask and the array of lenslets are disposed such that light from the wavefront that is transmitted by the transmissive region is focused onto the detector array by the array of lenslets.

20. The device of claim 19, wherein the device comprises an optical relay system that optically superimposes the mask and at least one lenslet on a plane conjugate with the pupil of the eye.

* * * * *